(12) United States Patent
Kurihara et al.

(10) Patent No.: US 7,368,202 B2
(45) Date of Patent: May 6, 2008

(54) ELECTROCHEMICAL DEVICE HAVING OPPOSING ELECTRODES

(75) Inventors: Masato Kurihara, Tokyo (JP); Tadashi Suzuki, Tokyo (JP); Atsushi Sano, Tokyo (JP); Hisashi Suzuki, Tokyo (JP); Toshinobu Miyakoshi, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 479 days.

(21) Appl. No.: 10/884,999

(22) Filed: Jul. 7, 2004

(65) Prior Publication Data

US 2005/0034299 A1 Feb. 17, 2005

(30) Foreign Application Priority Data

Jul. 7, 2003 (JP) ............................. 2003-271534
Jul. 5, 2004 (JP) ............................. 2004-198570

(51) Int. Cl.
*H01M 4/02* (2006.01)
*H01M 4/04* (2006.01)
*H01M 4/40* (2006.01)
*H01M 4/62* (2006.01)
*H01M 2/02* (2006.01)

(52) U.S. Cl. ................. 429/209; 429/122; 429/164; 429/217; 429/231.95; 429/232

(58) Field of Classification Search .................. None
See application file for complete search history.

(56) References Cited

U.S. PATENT DOCUMENTS 6,610,440 B1* 8/2003 LaFollette et al. .......... 429/122

2001/0019796 A1* 9/2001 Kang et al. .................. 429/94
2001/0036579 A1* 11/2001 Hosoya ................. 429/231.95
2004/0018430 A1* 1/2004 Holman et al. ............. 429/233

FOREIGN PATENT DOCUMENTS

| JP | A 05-114399 | 5/1993 |
| JP | A 11-329415 | 11/1999 |
| JP | A 2000-123876 | 4/2000 |
| JP | A 2000-138040 | 5/2000 |
| JP | A 2000-294221 | 10/2000 |
| JP | A 2000-348728 | 12/2000 |
| JP | A 2002-83585 | 3/2002 |
| JP | A 2002-334700 | 11/2002 |
| JP | A 2004-039538 | 2/2004 |
| JP | A 2004-039539 | 2/2004 |
| KR | A 2002-0006387 | 1/2002 |
| WO | CN A 1256799 | 6/2000 |

* cited by examiner

*Primary Examiner*—Jonathan Crepeau
*Assistant Examiner*—Tony Chuo
(74) *Attorney, Agent, or Firm*—Oliff & Berridge, PLC

(57) ABSTRACT

An electrochemical device comprises, at least, a first electrode, a second electrode, and an electrolyte layer having an ionic conductivity. The first and second electrodes oppose each other by way of the electrolyte layer. The first and second electrodes comprise a composite particle containing an electrode active material, a conductive auxiliary agent having an electronic conductivity, and a binder adapted to bind the electrode active material and conductive auxiliary agent to each other. In the composite particle, the electrode active material and conductive auxiliary agent are electrically coupled to each other without being isolated.

14 Claims, 11 Drawing Sheets

2 μm

2 μm

1 μm

1 μm

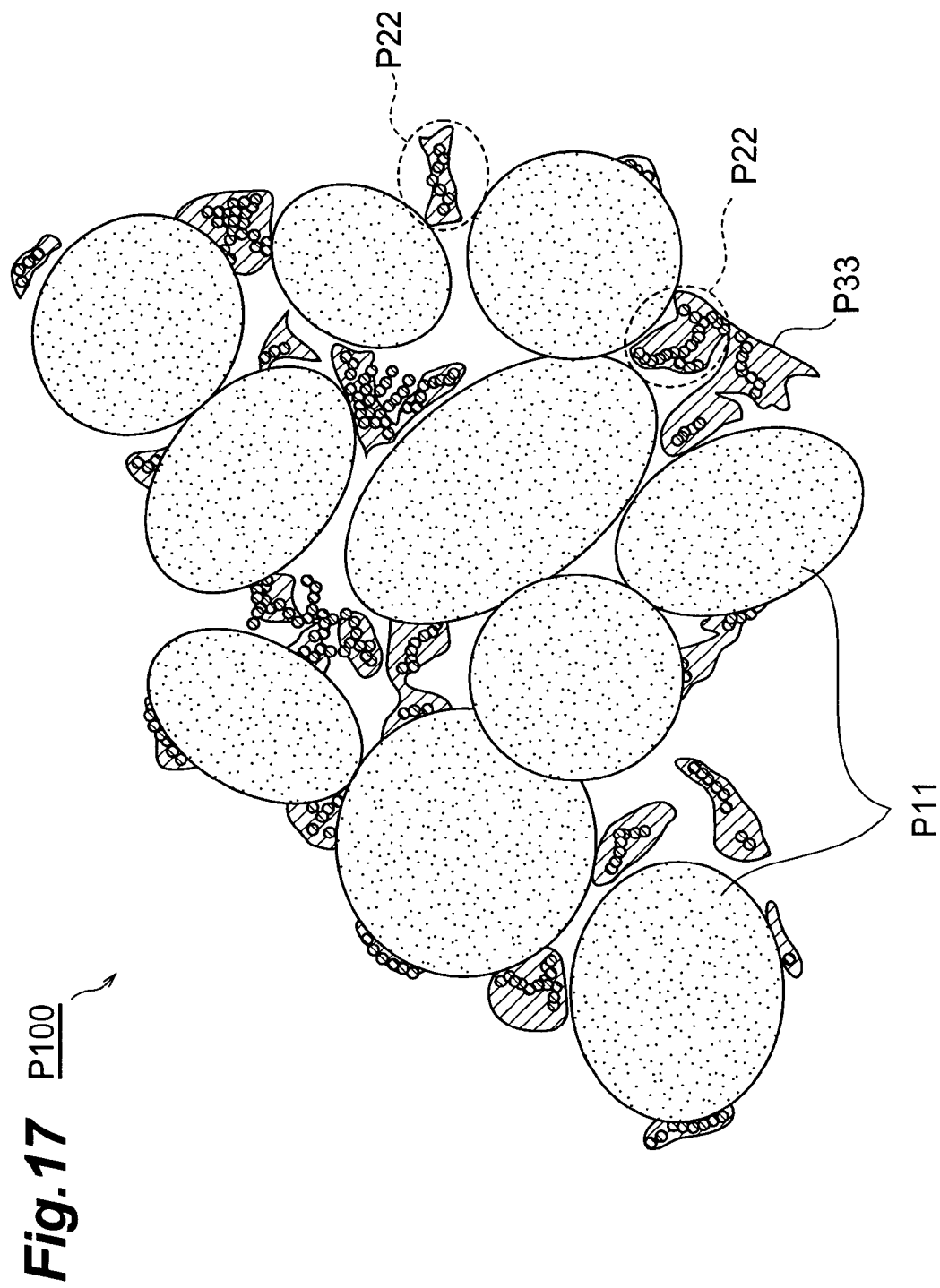

ELECTROCHEMICAL DEVICE HAVING OPPOSING ELECTRODES

BACKGROUND OF THE INVENTION

1. Field of the Invention

The present invention relates to an electrochemical device such as primary battery, secondary battery (lithium ion secondary battery in particular), electrolytic cell, and capacitor (electrochemical capacitor in particular).

2. Related Background Art

Electrochemical capacitors such as nonaqueous electrolytic secondary batteries like lithium ion secondary batteries, and electrochemical capacitors like electric double layer capacitors have been expected to become power supplies or backup power supplies for small-size electronic devices such as portable devices, and auxiliary power supplies for hybrid cars.

Therefore, the electrochemical devices have been required to have a structure which can easily attain such a smaller size and a lighter weight that they can be accommodated within a limited space where they are to be placed.

Known as an electrochemical device intended to attain such a smaller size and a lighter weight is one having a film-like form as follows.

One having a thin-film structure has been known, in which two composite package films (laminate films) each comprising a synthetic resin layer and a metal layer such as metal foil are overlaid on each other, their edge parts are heat-sealed (thermally fused) so as to produce a lightweight case (sealing bag) employed as an outer container for sealing constituents of an electrochemical device such as a pair of electrodes (anode and cathode) and an electrolyte (see, for example, the nonaqueous electrolytic secondary battery disclosed in Japanese Patent Application Laid-Open No. 2000-294221 and the nonaqueous electrolytic battery disclosed in Japanese Patent Application Laid-Open No. 2000-138040). In this case, the pair of electrodes are connected to respective metal leads each having one end for electric connection and the other end projecting out of the case.

The above-mentioned electrochemical device is mainly constituted by a cathode, an anode, and an electrolyte layer (e.g., a layer made of a liquid electrolyte or solid electrolyte) disposed between the cathode and the anode. Conventionally, the cathode and/or anode has been made by way of the steps of preparing an electrode coating liquid (e.g., in a slurry or paste form) containing an electrode active material, a binder (a synthetic resin or the like), a conductive auxiliary agent, and a dispersant and/or solvent; applying the coating liquid to a surface of a collector member (e.g., a metal foil); and then drying the coating liquid, thereby forming a layer containing the electrode active material (hereinafter referred to as "active material containing layer") on the surface of the collector member.

In this method (wet method), there is a case where the conductive auxiliary agent is not added to the coating liquid. There is also a case where, instead of the coating liquid, a kneaded product containing an electrode active material, a binder, and a conductive auxiliary agent is prepared without using the dispersant and solvent, and is formed into a sheet by using a hot roll and/or hot press. A conductive polymer may further be added to the coating liquid, so as to form a so-called "polymer electrode". When the electrolyte layer is solid, there is a case where a method comprising the step of applying a coating liquid to a surface of the electrolyte layer is employed.

SUMMARY OF THE INVENTION

However, the conventional electrochemical devices such as the batteries disclosed in Japanese Patent Application Laid-Open Nos. 2000-294221 and 2000-138040 have only a film-like form, and thus are likely to yield a dead space when accommodated in spaces having various forms other than the film form, and fail to utilize the space efficiently.

Also, the conventional electrochemical devices such as the batteries disclosed in Japanese Patent Application Laid-Open Nos. 2000-294221 and 2000-138040 cannot be made so small, whereby it has been quite difficult for them to be placed in a minute space (e.g., a space having a pillar form) having a size of $9.0 \times 10^{-3}$ cm$^3$ or less.

In view of the problems of prior art mentioned above, it is an object of the present invention to provide an electrochemical device which can easily be accommodated in spaces having various forms not limited to film forms, while having a structure suitable for being made smaller, such that it can easily be accommodated even in a minute space of $9.0 \times 10^{-3}$ cm$^3$ or less.

The inventors conducted diligent studies in order to achieve the above-mentioned object and, as a result, have found that, for achieving the above-mentioned object, it is quite effective to employ a composite particle containing, at least, an electrode active material, a conductive auxiliary agent, and a binder as constituent materials, in which the electrode active material, conductive auxiliary agent, and binder are sufficiently dispersed, thereby attaining the present invention.

Namely, the present invention provides an electrochemical device comprising, at least, a first electrode, a second electrode, and an electrolyte layer having an ionic conductivity, the first and second electrodes opposing each other by way of the electrolyte layer; wherein at least one of the first and second electrodes comprises a composite particle containing an electrode active material, a conductive auxiliary agent having an electronic conductivity, and a binder adapted to bind the electrode active material and conductive auxiliary agent to each other; and wherein the electrode active material and conductive auxiliary agent are electrically coupled to each other without being isolated in the active material containing layer.

The composite particle used in the electrode in accordance with the present invention is a particle in which the conductive auxiliary agent, electrode active material, and binder are in close contact with each other while in their respective quite favorable dispersion states. This composite particle is used as a main ingredient of a powder when the active material containing layer of the electrode is made by a dry method which will be explained later, or as a constituent material for a coating liquid or kneaded product when the active material containing layer of the electrode is made by a wet method which will be explained later.

Within the composite particle, a quite favorable electron conduction path (electron conduction network) is constructed three-dimensionally. The structure of the electron conduction path can substantially keep its initial state even after forming the active material containing layer by heating when the active material containing layer of the electrode is used as a main ingredient of a powder in the case where the active material containing layer is made by a dry method which will be explained later. Also, the structure of the electron conduction path can substantially keep its initial state in an easy manner even after preparing a coating liquid or kneaded product containing the composite particle when the active material containing layer of the electrode is used as a constituent material for the coating liquid or kneaded product in the case where the active material containing layer is made by a wet method which will be explained later if the preparing condition is regulated (e.g., by choosing the dispersant or solvent when preparing the coating liquid).

Namely, since the electrode of the present invention is formed in a state keeping the structure of the composite particle, the electrode active material and conductive auxiliary agent are electrically coupled to each other without being isolated in the active material containing layer. Therefore, a quite favorable electron conduction path (electron conduction network) is three-dimensionally constructed in the active material containing layer. Here, "the electrode active material and conductive auxiliary agent are electrically coupled to each other without being isolated in the composite particle" means that a particle (or an aggregate thereof) made of the electrode active material and a particle (or an aggregate thereof) made of the conductive auxiliary agent are electrically coupled to each other without "substantially" being isolated in the active material containing layer. More specifically, it refers to a state where a particle (or an aggregate thereof) made of the electrode active material and a particle (or an aggregate thereof) made of the conductive auxiliary agent are electrically coupled to each other to such an extent that an electric resistance at a level yielding the effect of the present invention can be achieved, instead of being electrically coupled to each other without being isolated at all.

The state where "the electrode active material and conductive auxiliary agent are electrically coupled to each other without being isolated in the composite particle" can be verified by photographs of SEM (Scanning Electron Microscope) and TEM (Transmission Electron Microscope) and analysis data of EDX (Energy Dispersive X-ray Fluorescence Spectrometer) concerning a cross section in the composite particle of the electrode in accordance with the present invention. Also, the electrode of the present invention can clearly be distinguished from a conventional electrode (or composite particle) when the SEM and TEM photographs and EDX analysis data of the cross section of the composite particle in the former are compared with those in the latter.

Since the first and second electrodes of the electrochemical device in accordance with the present invention comprise a composite particle as mentioned above, electrodes having various forms not limited to film forms can be formed if the shape of the composite particle is adjusted. Therefore, the electrochemical device of the present invention can easily be accommodated in spaces having various forms not limited to film forms.

Also, since the first and second electrodes of the electrochemical device in accordance with the present invention comprise a composite particle, an excellent structure which can easily be accommodated even in a minute space of $9.0 \times 10^{-3}$ cm$^3$ or less can be obtained if the particle size (dimension) of the composite particle is adjusted.

Therefore, the electrochemical device of the present invention can easily be used in the following applications which have been quite hard to be realized by the conventional electrochemical devices. Namely, the electrochemical device of the present invention can easily be used in power supplies for self-propelled micromachines and IC cards, and decentralized power supplies placed on or within printed boards.

On the other hand, the first and second electrodes of the conventional electrochemical device use the above-mentioned coating liquid (slurry) or kneaded product. In order for the electrode to be made smaller, forming a sheet-like (film-like) electrode in which the active material containing layer is formed on a surface of a sheet-like collector is effective when easiness in a coating or sheet-forming operation is taken into consideration. Hence, electrochemical devices obtained from the electrode are limited to film forms, and there is a limit for making them smaller.

In the present invention, by contrast, a composite particle itself is used as an electrode, so that the above-mentioned coating liquid (slurry) or kneaded product is not required to be used for forming the electrode, whereby the above-mentioned effect of the present invention can be obtained.

The "electrode active material" to become a constituent material for the composite particle in the present invention refers to the following materials depending on the electrode to be formed. Namely, the "electrode active material" refers to a reducing agent when the electrode to be formed is an electrode used as an anode of a primary battery, and an oxidizing agent when the electrode to be formed is a cathode of the primary battery. The "particle made of the electrode active material" may include substances other than the electrode active material to such an extent that the function of the present invention (function of the electrode active material) is not lost.

When the electrode to be formed is an anode (at the time of discharging) used in a secondary battery, the "electrode active material" is a reducing agent and is a substance which can exist chemically stably either in its reduced or oxidized state, whose reducing reaction from the oxidized state to the reduced state and oxidizing reaction from the reduced state to the oxidized state can advance reversibly. When the electrode to be formed is a cathode (at the time of discharging) used in the secondary battery, the "electrode active material" is an oxidizing agent and is a substance which can exist chemically stably either in its reduced or oxidized state, whose reducing reaction from the oxidized state to the reduced state and oxidizing reaction from the reduced state to the oxidized state can advance reversibly.

When the electrode to be formed is an electrode used in the primary or secondary battery, the "electrode active material" may be a material which can occlude or release (by intercalating or doping/undoping) a metal ion involved in an electrode reaction. Examples of this material include carbon materials used in anodes and/or cathodes of lithium ion secondary batteries and metal oxides (including mixed metal oxides).

For convenience of explanation, respective electrode active materials for the anode and cathode will be referred to as "anode active material" and "cathode active material". The "anode" in the "anode active material" refers to one (negative electrode active material) based on the polarity of the battery at the time of discharging, and the "cathode" in the "cathode active material" refers to one (positive electrode active material) based on the polarity of the battery at the time of discharging. Specific examples of the anode active material and cathode active material will be set forth later.

When the electrode to be formed is an electrode used in an electrolytic cell or capacitor (condenser), the "electrode active material" refers to a metal (including metal alloys), metal oxide, or carbon material having an electronic conductivity.

In this specification, the "electrochemical device" refers to one comprising, at least, a first electrode (anode) and a second electrode (cathode) which oppose each other, and an electrolyte layer having an ionic conductivity disposed between the first and second electrodes. The "electrolyte layer having an ionic conductivity" is (1) a porous separator formed from an insulating material and impregnated with an electrolytic solution (or a gel-like electrolyte obtained by adding a gelling agent to an electrolytic solution); (2) a solid electrolyte film (a film made of a solid polymer electrolyte or a film containing an ionically conductive inorganic material); (3) a layer made of a gel-like electrolyte obtained by adding a gelling agent to an electrolytic solution; or (4) a layer made of an electrolytic solution.

In any of the configurations of (1) to (4), the first and second electrodes may contain respective electrolytes used therein.

In this specification, a laminate constituted by the first electrode (anode), electrolyte layer, and second electrode (cathode) in the configurations of (1) to (3) will be referred to as "matrix" when necessary. The matrix may have not only three layers as in the above-mentioned configurations of (1) to (3), but also five or more layers in which the electrodes and electrolyte layers are laminated so as to alternate with each other.

In any of the above-mentioned configurations of (1) to (4), the electrochemical device may be configured as a module in which a plurality of unit cells are arranged in series or in parallel.

In the electrochemical device of the present invention, the electrolyte layer may comprise a solid electrolyte. In this case, the solid electrolyte may be a ceramic solid electrolyte, a solid polymer electrolyte, or a gel-like electrolyte obtained by adding a gelling agent to a liquid electrolyte.

In this case, an electrochemical device whose constituents are wholly solid (e.g., so-called "all-solid battery") can be constructed. This can easily achieve lighter weight and improvements in energy density and safety in the electrochemical device.

When an "all-solid electrode" (all-solid lithium ion secondary battery in particular) is constructed as the electrochemical device, the following advantages (I) to (IV) are obtained. (I) Since the electrolyte layer is made of a solid electrolyte instead of a liquid electrolyte, no leakage occurs, and an excellent heat resistance (high-temperature stability) can be obtained, whereby the reaction between electrolyte components and electrode active materials can fully be prevented from occurring. Therefore, excellent battery safety and reliability can be obtained. (II) The use of metal lithium as an anode (the construction of a so-called "metal lithium secondary battery"), which is hard to achieve in an electrolyte layer made of a liquid electrolyte, can be realized easily, so as to improve the energy density further. (III) When constructing a module in which a plurality of unit cells are arranged within a case, a plurality of unit cells can be connected in series, which has been impossible in an electrolyte layer made of a liquid electrolyte. Therefore, modules having various output voltages, relatively high output voltages in particular, can be constructed. (IV) As compared with the case where an electrolyte layer made of a liquid electrolyte is provided, a higher degree of freedom is achieved in terms of battery forms employable, and the battery can easily be constructed more compact. Therefore, the electrochemical device can easily conform to conditions (e.g., a position where it is placed, the size of a space where it is placed, and the form of the space) under which it is mounted as a power supply in a device such as a portable device.

In the electrochemical device in accordance with the present invention, the electrolyte layer may comprise a separator made of an insulating porous body, and a liquid or solid electrolyte infiltrated in the separator. When the solid electrolyte is used, a ceramic solid electrolyte, a solid polymer electrolyte, or a gel-like electrolyte obtained by adding a gelling agent to a liquid electrolyte can be used as well.

Preferably, in the present invention, the composite particle is formed by way of a granulating step of integrating the conductive auxiliary agent and binder with a particle made of the electrode active material in close contact with each other; whereas the granulating step comprises a material liquid preparing step of preparing a material liquid containing the binder, the conductive auxiliary agent, and a solvent; a fluidizing step of putting the particle made of the electrode active material into a fluidizing tank so as to fluidize the particle made of the electrode active material; and a spray-drying step of spraying the material liquid into a fluidized layer containing the particle made of the electrode active material so as to attach the material liquid to the particle made of the electrode active material, and drying the material liquid so as to eliminate the solvent from the material liquid attached to a surface of the particle made of the electrode active material, thereby causing the binder to bring the particle made of the electrode active material and a particle made of the conductive auxiliary agent into close contact with each other.

Thus, in the granulating step, it will be sufficient if droplets of the material liquid containing the conductive auxiliary agent and the like can directly be sprayed onto fluidizing particles. Therefore, the fluidizing method is not restricted in particular. For example, a fluidizing tank which generates a gas flow for fluidizing the particles, a fluidizing tank having a stirring blade for rotationally fluidizing the particles, and a fluidizing tank which fluidizes the particles by vibration can be used. In the method of making an electrode composite particle, from the viewpoint of homogenizing the form/size of the composite particle obtained, it will be preferred if the fluidizing step generates a gas flow in the fluidizing tank, puts the particle made of the electrode active material into the gas flow, and fluidizes the particle made of the electrode active material.

By forming a composite particle to become an electrode of the electrochemical device in accordance with the present invention by way of the above-mentioned granulating step, the inventors have found the following fact in spite of a common knowledge of those skilled in the art that the internal resistance of an electrode (or a composite particle to become its constituent material) tends to increase in general when the electrode (or a composite particle to become its constituent material) is formed by using a binder.

Namely, the inventors have found that, when a composite particle containing an electrode active material, a conductive auxiliary agent, and a binder is formed beforehand by way of the above-mentioned granulating step and employed as an electrode, the electrode (composite particle) having a specific resistance value (or an internal resistance value normalized with an apparent volume) sufficiently lower than that of the electrode active material by itself can be constructed in spite of the fact that the binder is contained.

Employing the granulating step having the above-mentioned configuration can more reliably form the above-mentioned composite particle, thereby more reliably yielding the effect of the present invention. In the granulating step, minute droplets of the material liquid containing the conductive auxiliary agent and binder are directly sprayed onto the particle made of the electrode active material within the fluidizing tank, so that constituent particles constituting the composite particle can sufficiently be prevented from aggregating, whereby the constituent particles in the resulting composite particle can fully be kept from being unevenly distributed. Also, the conductive auxiliary agent and binder can be brought into contact with the electrolytic solution and dispersed selectively and favorably over the surface of the electrode active material adapted to be involved in the electrode reaction.

Therefore, the composite particle to become the electrode of the electrochemical device in accordance with the present invention becomes a particle in which the conductive auxiliary agent, electrode active material, and binder are in close contact with each other while in their respective quite favorable dispersion states. Also, the particle size and form of the composite particle in accordance with the present invention can be adjusted arbitrarily if the temperature in the fluidizing tank, the amount of material liquid sprayed into the fluidizing tank, the amount of electrode active material put into the gas flow generated in the fluidizing tank, the rate of gas flow generated in the fluidizing tank, the mode (laminar flow, turbulent flow, etc.) of gas flow (circulation) in the granulating step, and the like are regulated.

A quite favorable electron conduction path (electron conduction network) is three-dimensionally constructed within the composite particle. As a result, the inventors presume that an electron conduction path (electron conduction network) much better than that in the conventional electrodes is three-dimensionally constructed within the electrode (composite particle) used in the electrochemical device of the present invention.

Here, the inventors have found that the conventional method of forming a sheet-like electrode used in a film-like electrochemical device employs a coating liquid (slurry) or kneaded product containing, at least, the electrode active material, conductive auxiliary agent, and binder mentioned above when forming the electrode, whereby the state of dispersion of the electrode active material, conductive auxiliary agent, and binder in the active material containing layer in the resulting electrode fails to construct an effective conduction network, e.g., the dispersion state is nonuniform, thus greatly affecting the occurrence of the above-mentioned problem.

Namely, the conventional method using a coating liquid or kneaded product applies the coating liquid or kneaded product onto a surface of a collector member, so as to form a coating film made of the coating liquid or kneaded product on the surface, and dries the coating film so as to eliminate the solvent, thereby forming an active material containing layer. The inventors have found that the conductive auxiliary agent and binder having lower specific gravity values float up in the process of drying the coating liquid, so that the dispersion state of the electrode active material, conductive auxiliary agent, and binder fail to construct an effective conduction network, e.g., the dispersion state is nonuniform, whereby the adhesion among the electrode active material, conductive auxiliary agent, and binder cannot be obtained sufficiently, and a favorable electron conduction path is not constructed in the resulting active material containing layer.

Further, a method of granulating a coating liquid (slurry) by spray-drying, i.e., a method of spraying a slurry comprising a solvent in a hot air so as to make a mass (composite particle) comprising an electrode active material, a conductive agent, and a binder, has conventionally been known. Since the electrode active material, conductive auxiliary agent, and binder are contained in the same slurry in this case, the state of dispersion of the electrode active material, conductive auxiliary agent, and binder in the resulting granule (composite particle) depends on the state of dispersion of the electrode active material, conductive auxiliary agent, and binder in the slurry (the state of dispersion of the electrode active material, conductive auxiliary agent, and binder in the process of drying droplets of the slurry in particular). Therefore, the aggregation and uneven distribution of the binder and that of the conductive auxiliary agent occur, so that the state of dispersion of the electrode active material, conductive auxiliary agent, and binder in the resulting granule (composite particle) fails to construct an effective conduction network, e.g., the dispersion state becomes nonuniform, whereby the adhesion among the electrode active material, conductive auxiliary agent, and binder cannot be obtained sufficiently, and a favorable electron conduction path is not constructed in the resulting active material containing layer.

The inventors have also found that, in this case, the conductive auxiliary agent and binder cannot be brought into contact with the electrolytic solution so as to be dispersed selectively and favorably over the surface of the electrode active material adapted to be involved in the electrode reaction, whereby an inutile portion of the conductive auxiliary agent failing to contribute to constructing an electron conduction network which efficiently conducts electrons occurring in a reaction site, and an inutile portion of the binder which just increases the electric resistance exist.

The inventors have found that, in the method of making a mass (composite particle) comprising an electrode active material, a conductive agent, and a binder by spray-drying a slurry comprising a solvent into a hot air, the drying and solidification advances while the electrode active material, conductive agent, and binder are dispersed in the solvent, so that the aggregation of binder particles and the aggregation of conductive agents proceed during the drying, whereby the conductive agent and binder fail to come into close contact with the surface of the particles made of the electrode active material constituting the mass (comosite particles), in a state keeping an effective conduction network and being fully dispersed.

More specifically, the inventors have found that, as shown in FIG. 17, particles made of the positive active material constituting the mass (composite particle) P100 include many particles P11 surrounded by only aggregates P33 made of large binder particles so as to be isolated electrically within the mass (composite particle) P100 without being used. The inventors have also found that, when particles made of the binder form an aggregate during the drying, these particles are distributed unevenly as aggregates P22, thus failing to construct a sufficient electron conduction path (electron conduction network) in the mass (composite particle) P100 and yield a sufficient electronic conductivity. The inventors have further found that the aggregates P22 of particles made of the conductive agent may be surrounded by only the aggregates P33 made of large particles of the binder, so as to be electrically isolated, thus failing to construct a sufficient electron conduction path (electron conduction network) in the mass (composite particle) P100 and yield a sufficient electronic conductivity from this viewpoint as well.

In the granulating step in accordance with the present invention, "integrating the conductive auxiliary agent and binder with a particle made of the electrode active material in close contact with each other" refers to a state where a particle made of the conductive auxiliary agent and a particle made of the binder are brought into contact with at least a part of a surface of the particle made of the electrode active material. Namely, it will be sufficient if the surface of the particle made of the electrode active material is partly covered with the particle made of the conductive auxiliary agent and the particle made of the binder, and is not required to be completely covered. The "binder" used in the granulating step in the method of making a composite particle in accordance with the present invention refers to one capable of binding the electrode active material and conductive auxiliary agent used therewith.

Further adding a conductive polymer having an ionic conductivity as a constituent material when forming the composite particle can easily construct a quite favorable ion conduction path within the composite particle (i.e., electrode) in the present invention.

When usable as a binder to become a constituent material of the composite particle, a conductive polymer having an ionic conductivity may be used. The binder having an ionic conductivity also seems to contribute to constructing an ion conduction path within the electrode (composite particle). Using this composite particle can form a polymer electrode comprising the composite particle. Polymer electrolytes having an electronic conductivity may also be used as a binder to become a constituent material of the composite particle.

Such a configuration allows the present invention to form an electrode having electronic and ionic conductivities superior to those of the conventional electrodes easily and reliably. In the electrode comprising the composite particle, an interface where the conductive auxiliary agent, electrode active material, and electrolyte (solid electrolyte or liquid electrolyte) are in contact with each other, which becomes a reaction site of a charge-transfer reaction advancing within the electrode, is formed three-dimensionally with a sufficient size.

Since a favorable composite particle in which the conductive auxiliary agent, electrode active material, and binder have respective quite favorable dispersion states is formed beforehand, amounts of addition of the conductive auxiliary agent and binder can be made sufficiently smaller than those conventionally required.

When a conductive polymer is used in the present invention, the conductive polymer may be of the species identical to or different from the conductive polymer to become a constituent of the composite particle mentioned above.

In the present invention, the electrode active material may be an active material usable as a cathode of a primary or secondary battery. Also, in the present invention, the electrode active material may be an active material usable as an anode of a primary or secondary battery. Further, in the present invention, the electrode active material may be a carbon material or metal oxide having an electronic conductivity usable for an electrode constituting an electrolytic cell or capacitor. In the present invention, the electrolytic cell or capacitor refers to an electrochemical cell comprising, at least, a first electrode (anode), a second electrode (cathode), and an electrolyte layer having an ionic conductivity, wherein the first electrode (anode) and second electrode (cathode) oppose each other by way of the electrolyte layer. In this specification, "capacitor" is synonymous with "condenser".

From the viewpoint of forming the composite particle having the above-mentioned structure more easily and more reliably, the granulating step in the present invention preferably adjusts the temperature in the fluidizing tank to a temperature of at least 50° C. but not greatly exceeding the melting point of the binder, more preferably at least 50° C. but not higher than the melting point of the binder. Though depending on the species of the binder, the melting point of the binder is about 200° C., for example. When the temperature in the fluidizing tank is less than 50° C., the drying of the solvent during the spraying is more likely to become insufficient. When the temperature in the fluidizing tank greatly exceeds the melting point, the binder is more likely to melt and greatly obstruct particles from being formed. When the temperature in the fluidizing tank is slightly higher than the melting point of the binder, the above-mentioned problems can sufficiently be prevented from occurring depending on conditions. When the temperature in the fluidizing tank is not higher than the melting point of the binder, the above-mentioned problems do not occur.

From the viewpoint of forming the composite particle having the above-mentioned structure more easily and more reliably, the gas flow generated in the fluidizing tank in the granulating step in the present invention is preferably a gas flow comprising an air, a nitrogen gas, or an inert gas. Preferably, in the granulating step, the fluidizing tank has a humidity (relative humidity) of 30% or less therein in the above-mentioned preferred temperature range. Here, "inert gas" refers to gases belonging to noble gases.

Preferably, in the present invention, the solvent contained in the material liquid is adapted to dissolve or disperse the binder and disperse the conductive auxiliary agent. This can further enhance the dispersibility of the binder, conductive auxiliary agent, and electrode active material in the resulting composite particle as well. From the viewpoint of further enhancing the dispersibility of the binder, conductive auxiliary agent, and electrode active material in the composite particle, it will be preferred if the solvent contained in the material liquid is adapted to dissolve the binder and disperse the conductive auxiliary agent.

In the electrochemical device of the present invention, the composite particle may have a particle size of 0.2 to 2000 μm. When an electrode comprising such a composite particle is provided, the electrochemical device can easily be accommodated in a minute space of $1.5 \times 10^{-10}$ to $9.0 \times 10^{-3}$ cm$^3$.

The electrochemical device of the present invention may comprise a case for accommodating the first electrode, second electrode, and electrolyte layer in a closed state, the case having a substantially columnar form. When such a case is employed, a large number of compact electrochemical devices which can efficiently utilize minute spaces without waste can be made promptly.

The "case" can arbitrarily choose its constituent materials according to the usage and environment of use of the battery. For example, it may be a metal case, a synthetic resin case, a glass case, or a ceramic case.

The case may have such a size that it can be accommodated in a space having a volume of $1.5 \times 10^{-10}$ to $9.0 \times 10^{-3}$ cm$^3$.

In the present invention, at least one of the first and second electrodes may be made of the single composite particle. This can more reliably and more easily make an electrochemical device having a structure suitable for being made smaller, such that it can easily be accommodated even in a minute space of $9.0 \times 10^{-3}$ cm$^3$ or less. From the viewpoint of further reliably attaining such an electrochemical device, it will be preferred if both of the first and second electrodes are constituted by one composite particle each.

The present invention can provide an electrochemical device which can easily be accommodated in spaces having various forms not limited to film forms, while having a structure suitable for being made smaller, such that it can easily be accommodated even in a minute space of $9.0 \times 10^{-3}$ cm$^3$ or less.

BRIEF DESCRIPTION OF THE DRAWINGS

FIG. 17 is a schematic sectional view roughly showing a partial configuration of a conventional electrode composite particle, and an inner structure of an active material containing layer of an electrode formed by using the conventional electrode composite particle.

DESCRIPTION OF THE PREFERRED EMBODIMENTS

In the following, preferred embodiments of the present invention will be explained in detail with reference to the drawings. In the following, parts identical or equivalent to each other will be referred to with numerals identical to each other, without repeating their overlapping descriptions.

Figure 1:
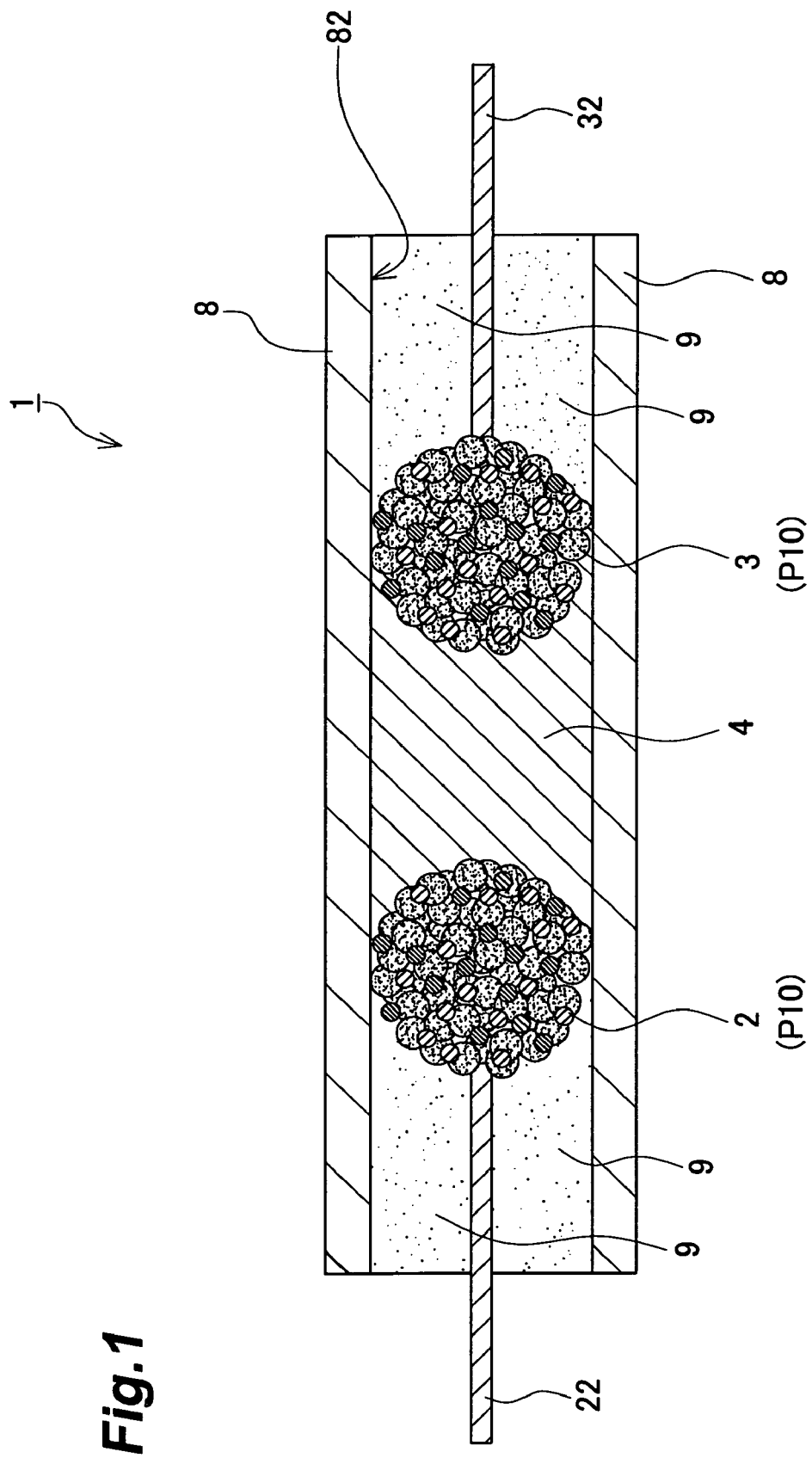
FIG. 1 is a schematic sectional view showing the basic configuration of a preferred embodiment of the electrochemical device (lithium ion secondary battery) in accordance with the present invention.
Figure 2:
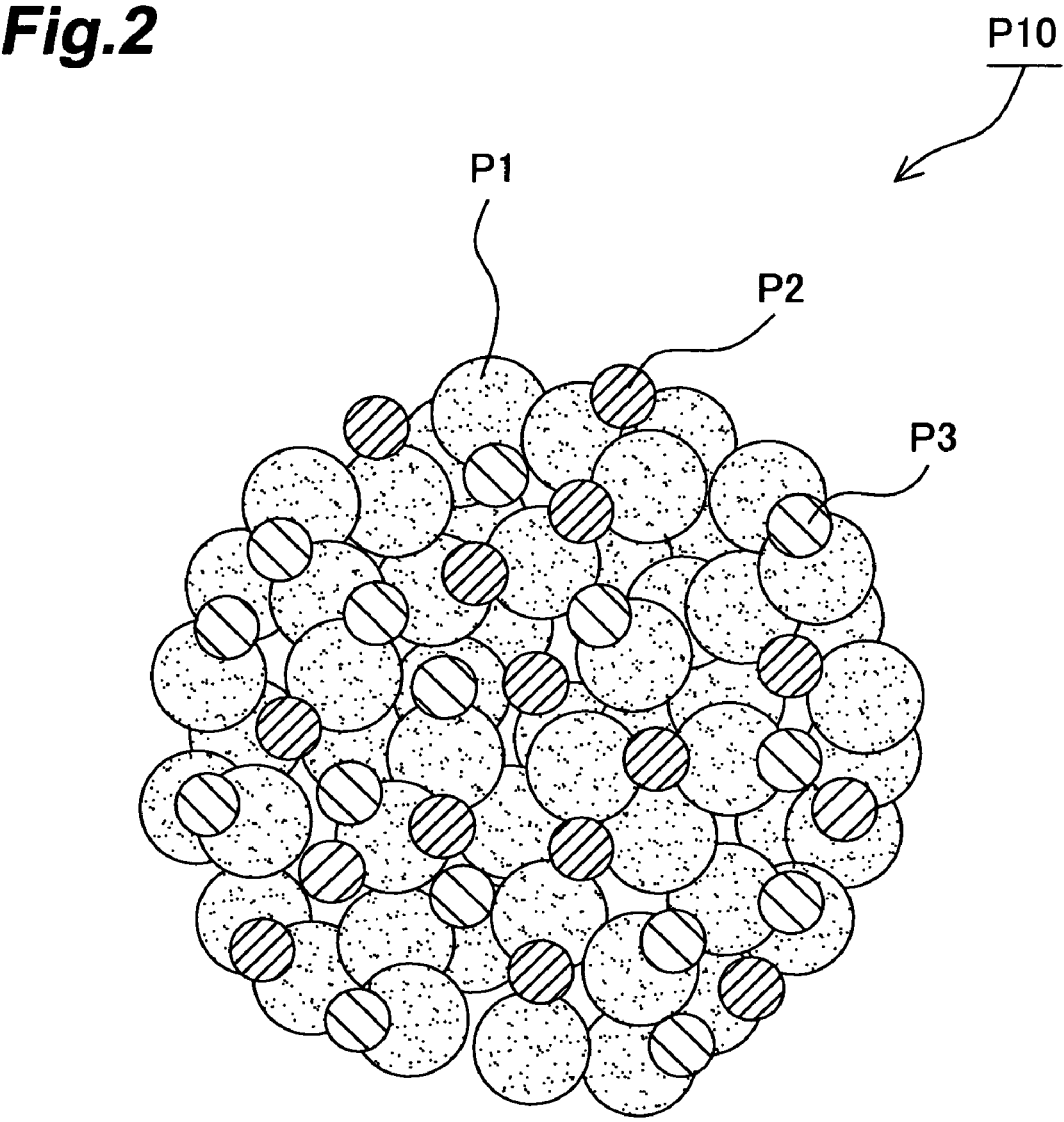
FIG. 2 is a schematic sectional view showing an example of the basic configuration of a composite particle made in a granulating step when making an electrode.
Figure 3:
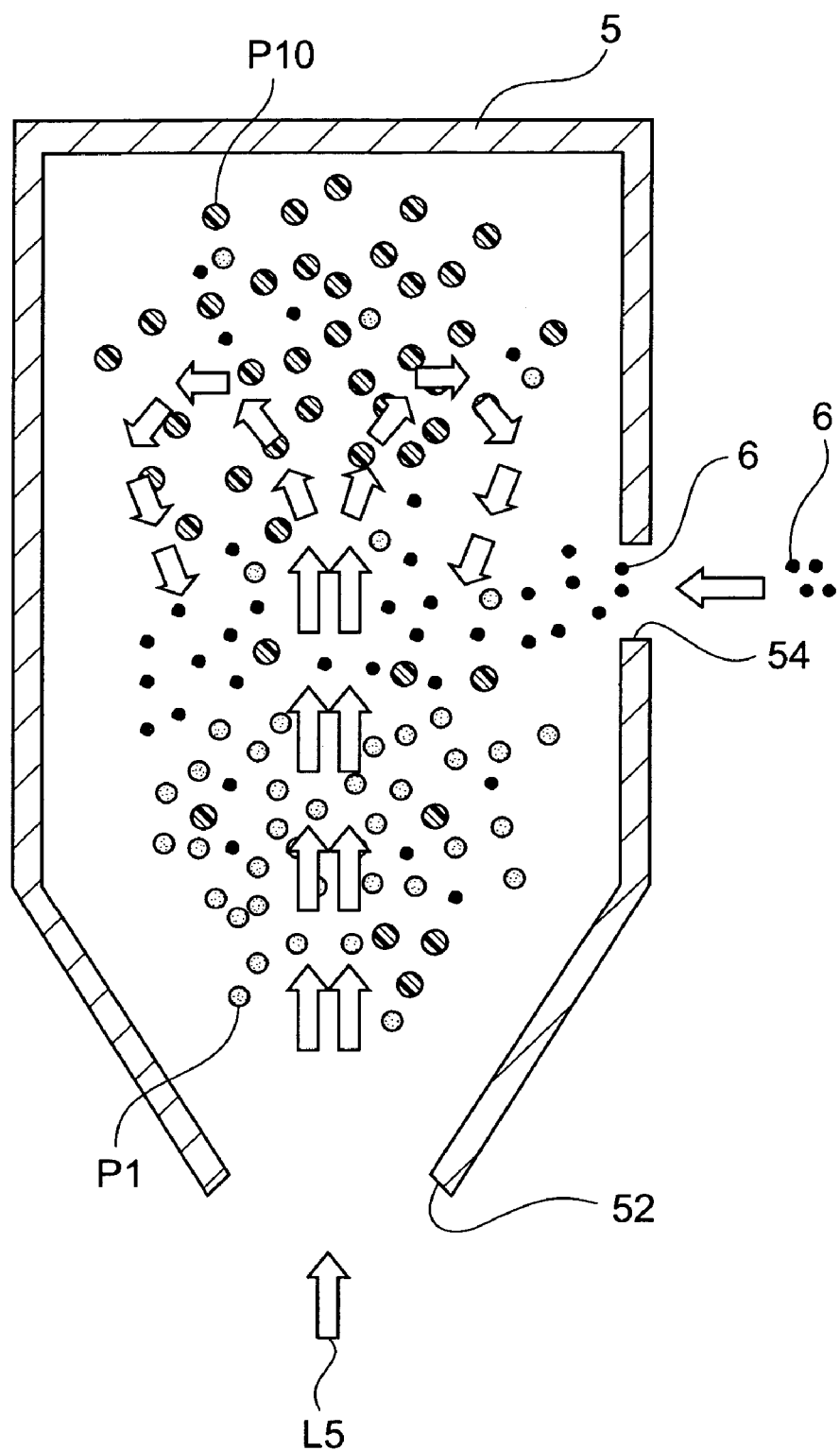
FIG. 3 is an explanatory view showing an example of the granulating step when making the electrode.

FIG. 1 is a schematic sectional view showing the basic configuration of a preferred embodiment of the electrochemical device (lithium ion secondary battery) in accordance with the present invention. FIG. 2 is a schematic sectional view showing an example of the basic configuration of a composite particle used in an electrode of the electrochemical device in accordance with the present invention. FIG. 3 is a schematic sectional view showing an example of the basic configuration of the composite particle made in a granulating step when making electrodes (anode 2 and cathode 3).

The secondary battery 1 shown in FIG. 1 is mainly constituted by an anode 2 (first electrode), a cathode 3 (second electrode), and an electrolyte layer 4 disposed between the anode 2 and cathode 3. Each of the anode 2 and cathode 3 is made of a composite particle P10 shown in FIG. 2. Thus, the secondary battery 1 shown in FIG. 1 comprises the anode 2 and cathode 3 each made of the composite particle P10 shown in FIG. 2, and thus can easily be accommodated in spaces having various forms not limited to film forms, while having a structure suitable for being made smaller, such that it can easily be accommodated even in a minute space of $9.0 \times 10^{-3}$ cm$^3$ or less.

The composite particle P10 is constituted by particles P1 made of an electrode active material, particles P2 made of a conductive auxiliary agent, and particles P3 made of a binder. The average particle size of the composite particle P10 is not limited in particular. The composite particle P10 has a structure in which the particles P1 made of the electrode active material and the particles P2 made of the conductive auxiliary agent are electrically coupled to each other without being isolated. Therefore, a structure in which the particles P1 made of the electrode active material and the particles P2 made of the conductive auxiliary agent are electrically coupled to each other without being isolated is formed in the active material containing layer as well.

The anode 2, cathode 3, and electrolyte layer 4 are accommodated in a tubular case 8 having a communicating hole 82. One end of an anode lead 22 is electrically connected to the anode 2. The other end of the anode lead 22 projects out of the case 8. One end of a cathode lead 32 is electrically connected to the cathode 3. The other end of the cathode lead 32 projects out of the case 8.

Openings at both ends of the communicating hole 82 of the case 8 are filled with a sealant 9 for sealing a matrix part comprising the anode 2, cathode 3, and electrolyte layer 4 into the case 8, such that the space between the anode lead 22 and the inner wall of the case 8 and the space between the cathode lead 32 and the inner wall of the case 8 are filled.

The case 8 has such a size that it can be accommodated in a space having a volume of $1.5 \times 10^{-10}$ to $9.0 \times 10^{-3}$ cm$^3$. The material constituting the case 8 can arbitrarily be selected according to the usage and environment of use of the secondary battery 1. For example, it may be a metal case, a synthetic resin case, a glass case, or a ceramic case.

The sealant 9 is not limited in particular as long as it can seal the matrix part comprising the anode 2, cathode 3, and electrolyte layer 4 into the case 8, but is required to be hard to dissolve in an electrolytic solution and have a low moisture permeability when the electrolytic solution is used. Its examples include epoxy and denatured polypropylene.

An example of the anode lead 22 is a lead made of nickel. An example of the cathode lead 32 is a lead made of aluminum.

The anode 2 of the secondary battery 1 shown in FIG. 1 is constituted by the composite particle P10 shown in FIG. 2. At the time of charging, the anode 2 is connected to an anode of an external power supply (not depicted), and functions as a cathode. The form of the anode 2 is not restricted in particular. For example, it may be substantially spherical as depicted. Also, one having the substantially spherical form may be collapsed so as to become flat before being put into the case 8.

Also, the composite particle P10 of the anode 2 is constituted by particles P1 made of the electrode active material, particles P2 made of the conductive auxiliary agent, and particles P3 made of the binder as shown in FIG. 2. The average particle size of the composite particle P10 is not limited in particular.

The electrode active material constituting the composite particle P10 of the anode 2 is not restricted in particular, whereby a known electrode active material may be used. Examples of the material include carbon materials such as graphite which can occlude/release lithium ions (by intercalating or doping/undoping), carbon which is hard to graphitize, carbon which is easy to graphitize, and carbon which can be fired at a low temperature; metals such as Al, Si, and Sn which can combine with lithium; amorphous compounds mainly composed of oxides such as $SiO_2$ and $SnO_2$; and lithium titanate ($Li_3Ti_5O_{12}$).

The conductive auxiliary agent constituting the composite particle P10 contained in the anode 2 is not restricted in particular, whereby a known conductive auxiliary agent may be used. Examples of the conductive auxiliary agent include carbon materials such as carbon blacks, highly crystalline synthetic graphite, and natural graphite; fine powders of metals such as copper, nickel, stainless steel, and iron; mixtures of the carbon materials and fine metal powders; and conductive oxides such as ITO.

The binder constituting the composite particle P10 of the anode 2 is not limited in particular as long as it can bind the electrode active material particles to the particles P2 made of the conductive auxiliary agent. Examples of the binder include fluorine resins such as polyvinylidene fluoride (PVDF), polytetrafluoroethylene (PTFE), tetrafluoroethylene/hexafluoropropylene copolymer (FEP), tetrafluoroethylene/perfluoroalkylvinyl ether copolymer (PFA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF).

Examples of the binder other than those mentioned above include vinylidene fluoride type rubbers such as vinylidene fluoride/hexafluoropropylene type rubber (VDF/HFP type fluorine rubber), vinylidene fluoride/hexafluoropropylene/tetrafluoroethylene type fluorine rubber (VDF/HFP/TFE type rubber), vinylidene fluoride/pentafluoropropylene type fluorine rubber (VDF/PFP type fluorine rubber), vinylidene fluoride/pentafluoropropylene/tetrafluoroethylene type fluorine rubber (VDF/PFP/TFE type fluorine rubber), vinylidene fluoride/perfluoromethylvinyl ether/tetrafluoroethylene type fluorine rubber (VDF/PFMVE/TFE type fluorine rubber), and vinylidene fluoride/chlorotrifluoroethylene type fluorine rubber (VDF/CTFE type fluorine rubber).

Examples of the binder other than those mentioned above include polyethylene, polypropylene, polyethylene terephthalate, aromatic polyamide, cellulose, styrene/butadiene rubber, isoprene rubber, butadiene rubber, and ethylene/propylene rubber. Also employable are thermoplastic elastomer type polymers such as styrene/butadiene/styrene block copolymer, its hydrogenated products, styrene/ethylene/butadiene/styrene copolymer, styrene/isoprene/styrene block copolymer, and its hydrogenated products. Further, syndiotactic 1,2-polybutadiene, ethylene/vinyl acetate copolymer, propylene α-olefin (with a carbon number of 2 to 12) copolymer, and the like may be used. Also, conductive polymers may be used.

Particles made of conductive polymers may further be added to the composite particle P10 as a constituent thereof.

For example, the conductive polymers are not restricted in particular as long as they have a lithium ion conductivity. Examples of the conductive polymers include those in which monomers of polymer compounds (e.g., polyether type polymer compounds such as polyethylene oxide and polypropylene oxide, crosslinked polymers of polyether compounds, polyepichlorohydrin, polyphosphazene, polysiloxane, polyvinylpyrrolidone, polyvinylidene carbonate, and polyacrilonitrile) are complexed with lithium salts such as $LiClO_4$, $LiBF_4$, $LiPF_6$, $LiAsF_6$, $LiCl$, $LiBr$, $Li(CF_3SO_2)_2N$, and $LiN(C_2F_5SO_2)_2$ or alkali metal salts mainly composed of lithium. Examples of a polymerization initiator used for complexation include photopolymerization initiators and thermal polymerization initiators suitable for the above-mentioned monomers.

When the electrochemical device is a metal lithium secondary battery, the anode 2 may be an electrode comprising a particle (not depicted) made of metal lithium or a lithium alloy. The lithium alloy is not limited in particular, examples of which include alloys such as Li—Al, LiSi, and LiSn (LiSi being handled as an alloy here). In this case, the cathode is constituted by the composite particle P10 having a configuration which will be explained later.

The cathode 3 of the secondary battery 1 shown in FIG. 1 is also constituted by the composite particle P10 shown in FIG. 2. At the time of charging, the cathode 3 is connected to a cathode of an external power supply (not depicted), and functions as an anode. The form of the cathode 3 is not restricted in particular. For example, it may be substantially spherical as depicted.

The electrode active material constituting the cathode 3 is not restricted in particular, whereby known electrode active materials may be used. Examples of the electrode active material include lithium cobaltate ($LiCoO_2$), lithium nickelate ($LiNiO_2$), lithium manganese spinel ($LiMn_2O_4$), mixed metal oxides expressed by the general formula of $LiNi_xM-n_yCo_zO_2$ (x+y+z=1), lithium vanadium compounds, $V_2O_5$, olivine type $LiMPO_4$ (where M is Co, Ni, Mn, or Fe), and lithium titanate ($Li_3Ti_5O_{12}$).

The constituents other than the electrode active material constituting the composite particle P10 contained in the cathode 3 may be the same as those constituting the composite particle P10 contained in the anode 2.

From the viewpoint of forming the contact interface among the conductive auxiliary agent, electrode active material, and solid polymer electrolyte three-dimensionally with a sufficient size, the BET specific surface area of the particle P1 made of the electrode active material contained in the cathode 3 is preferably 0.1 to 1.0 $m^2/g$, more preferably 0.1 to 0.6 $m^2/g$. Similarly, the BET specific surface area of the particle P1 in the anode 2 is preferably 0.1 to 10 $m^2/g$, more preferably 0.1 to 5 $m^2/g$. In a double layer capacitor, it will be preferred if the BET specific surface area of the particle P1 is 500 to 3000 $m^2/g$ in each of the cathode 3 and anode 2.

From the same viewpoint, the average particle size of the particle P1 made of the electrode active material in the cathode 3 is preferably 5 to 20 μm, more preferably 5 to 15 μm. The average particle size of the particle P1 made of the electrode active material in the anode 2 is preferably 1 to 50 μm, more preferably 1 to 30 μm. From the same viewpoint, the amount of the conductive auxiliary agent and binder attached to the electrode active material is preferably 1 to 30 mass %, more preferably 3 to 15 mass %, when expressed by the value of 100×(mass of conductive auxiliary agent+ mass of binder)/(mass of electrode active material).

The electrolyte layer 4 may be a layer made of an electrolytic solution, a layer made of a solid electrolyte (ceramic solid electrolyte or solid polymer electrolyte), or a layer constituted by a separator and an electrolytic solution and/or solid electrolyte infiltrated into the separator.

The electrolytic solution is prepared by dissolving a lithium-containing electrolyte into a nonaqueous solvent. The lithium-containing electrolyte may appropriately be selected from $LiClO_4$, $LiBF_4$, $LiPF_6$, and the like, for example. Also usable are lithium imide salts such as $Li(CF_3SO_2)_2N$ and $Li(C_2F_5SO_2)_2N$, and $LiB(C_2O_4)_2$. The nonaqueous solvent can be selected from organic solvents exemplified in Japanese Patent Application Laid-Open No. SHO 63-121260 and the like, e.g., ethers, ketones, and carbonates. In particular, carbonates are preferably used in the present invention. Among the carbonates, a mixed solvent mainly composed of ethylene carbonate with at least one species of other solvents added thereto is preferably used in particular. Usually, it will be preferred if the mixing ratio of ethylene carbonate/other solvents=5 to 70:95 to 30 (by volume). Ethylene carbonate has a high coagulation point of 36.4° C. and is solid at normal temperature, thus failing to be used by itself as an electrolytic solution for a battery. However, when at least one species of other solvents having a lower coagulation point is added thereto, the mixed solvent lowers its coagulation point and thus becomes usable. Here, any solvents can be added as long as they lower the coagulation point of ethylene carbonate. Examples of such a solvent include diethyl carbonate, dimethyl carbonate, propylene carbonate, 1,2-dimethoxyethane, methylethyl carbonate, γ-butyrolactone, γ-valerolactone, γ-octanoic lactone, 1,2-diethoxyethane, 1,2-ethoxymethoxyethane, 1,2-dibutoxyethane, 1,3-dioxolane, tetrahydrofuran, 2-methyltetrahydrofuran, 4,4-dimethyl-1,3-dioxane, butylene carbonate, and methyl formate. Using a carbonaceous material as an active material of the anode with the above-mentioned mixed solvent can remarkably improve the battery capacity and sufficiently lower the irreversible capacity ratio.

An example of the solid polymer electrolyte is a conductive polymer having an ionic conductivity usable for the anode 2 or cathode 3.

The conductive polymer is not restricted in particular as long as it has a lithium ion conductivity. Examples of the conductive polymer include those in which monomers of polymer compounds (polyether type polymer compounds such as polyethylene oxide and polypropylene oxide, crosslinked polymers of polyether compounds, polyepichlorohydrin, polyphosphazene, polysiloxane, polyvinylpyrrolidone, polyvinylidene carbonate, polyacrylonitrile, etc.) are complexed with lithium salts such as $LiClO_4$, $LiBF_4$, $LiPF_6$, $LiAsF_6$, LiCl, LiBr, $Li(CF_3SO_2)_2N$, and $LiN(C_2F_5SO_2)_2$ or alkali metal salts mainly composed of lithium. Examples of a polymerization initiator used for complexation include photopolymerization initiators and thermal polymerization initiators suitable for the above-mentioned monomers.

Examples of support salts constituting the polymer solid electrolyte include salts such as $LiClO_4$, $LiPF_6$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO_2)_2$, and their mixtures.

When a separator is used in the electrolyte layer 4, examples of its constituent material include at least one species (a laminate of two or more layers of films or the like in the case of two or more species) of polyolefins such as polyethylene and polypropylene, polyesters such as polyethylene terephthalate, thermoplastic fluorine resins such as ethylene/tetrafluoroethylene copolymer, and celluloses. Examples of the form of the sheet include microporous films, woven fabrics, and nonwoven fabrics having an air permeability of about 5 to 2000 sec/100 cc measured by the method defined in JIS-P8117 and a thickness of about 5 to 100 μm. A monomer of a solid electrolyte may be infiltrated into the separator and then cured so as to be polymerized for use. Also, the above-mentioned electrolytic solution may be contained in a porous separator for use.

A preferred embodiment of the method of making the electrochemical device in accordance with the present invention will now be explained. First, a granulating step of making the composite particle P10 will be explained.

Next, a preferred embodiment of the method of making the composite particle P10 will be explained.

The composite particle P10 is formed by way of the granulating step of forming a composite particle containing an electrode active material, a conductive auxiliary agent, and a binder by integrating the conductive auxiliary agent and binder with a particle P1 made of the electrode active material in close contact with each other. This granulating step will be explained.

The granulating step will be explained more specifically with reference to FIG. 3. FIG. 3 is an example of the granulating step when making the composite particle.

The granulating step includes a material liquid preparing step of preparing a material liquid containing the binder, the conductive auxiliary agent, and a solvent; a fluidizing step of putting the particle made of the electrode active material into a fluidizing tank so as to fluidize the particle made of the electrode active material; and a spray-drying step of spraying the material liquid into a fluidized layer containing the particle made of the electrode active material so as to attach the material liquid to the particle made of the electrode active material, and drying the material liquid so as to eliminate the solvent from the material liquid attached to a surface of the particle made of the electrode active material, thereby causing the binder to bring the particle made of the electrode active material and a particle made of the conductive auxiliary agent into close contact with each other.

First, in the material liquid preparing step, using a solvent adapted to dissolve the binder, the binder is dissolved in the solvent. Subsequently, the conductive auxiliary agent is dispersed in thus obtained solution, so as to yield a material liquid. A solvent (dispersant) adapted to dissolve the binder may be used in the material liquid preparing step as well.

Next, in the fluidizing step, a gas flow is generated in a fluidizing tank 5 as shown in FIG. 3, and particles P1 made of the electrode active material are put into the gas flow, so as to fluidize the particles made of the electrode active material.

Next, in the spray-drying step, droplets 6 of the material liquid are sprayed within the fluidizing tank 5 as shown in FIG. 3, so as to be attached to the fluidized particles P1 made of the electrode active material and simultaneously dried within the fluidizing tank 5, the solvent is eliminated from the droplets 6 of the material liquid attached to the surface of the particles P1 made of the electrode active material, and the binder brings the particles P1 made of the electrode active material into close contact with the particles P2 made of the conductive auxiliary agent, thereby yielding the composite particle P10.

More specifically, the fluidizing tank 5 is a container having a tubular form, for example, and has a bottom part provided with an opening 52 for introducing a flow of warm air (or hot air) L5 from the outside and causing convection of the particles made of the electrode active material within the fluidizing tank 5. The side face of the fluidizing tank 5 is provided with an opening 54 for introducing the droplets 6 of the material liquid to be sprayed to the particles P1 made of the electrode active material convected within the fluidizing tank 5. The droplets 6 of the material liquid containing the binder, conductive auxiliary agent, and solvent are sprayed to the particles P1 made of the electrode active material convected within the fluidizing tank 5.

Here, by regulating the temperature of the warm air (or hot air), for example, the temperature of the atmosphere in which the particles P1 made of the electrode active material are placed is held at a predetermined temperature preferably a temperature from 50° C. to a temperature not greatly exceeding the melting point of the binder, more preferably a temperature from 50° C. to a temperature not higher than the melting point of the binder (e.g., 200° C.)] at which the solvent in the droplets 6 can rapidly be removed, so as to dry the liquid film of the material liquid formed on the surfaces of the particles P1 made of the electrode active material substantially simultaneously with the spraying of the droplets 6 of the material liquid. This brings the binder and the conductive auxiliary agent into close contact with the surfaces of the particles made of the electrode active material, thereby yielding the composite particle P10.

The solvent adapted to dissolve the binder is not restricted in particular as long as it can dissolve the binder and disperse the conductive auxiliary agent. For example, N-methyl-2-pyrrolidone and N,N-dimethylformamide can be used.

With the species of the particles P1 made of the electrode active material changed, the composite particle P10 for the anode 2 and the composite particle P10 for the cathode 3 are formed.

Figure 4:
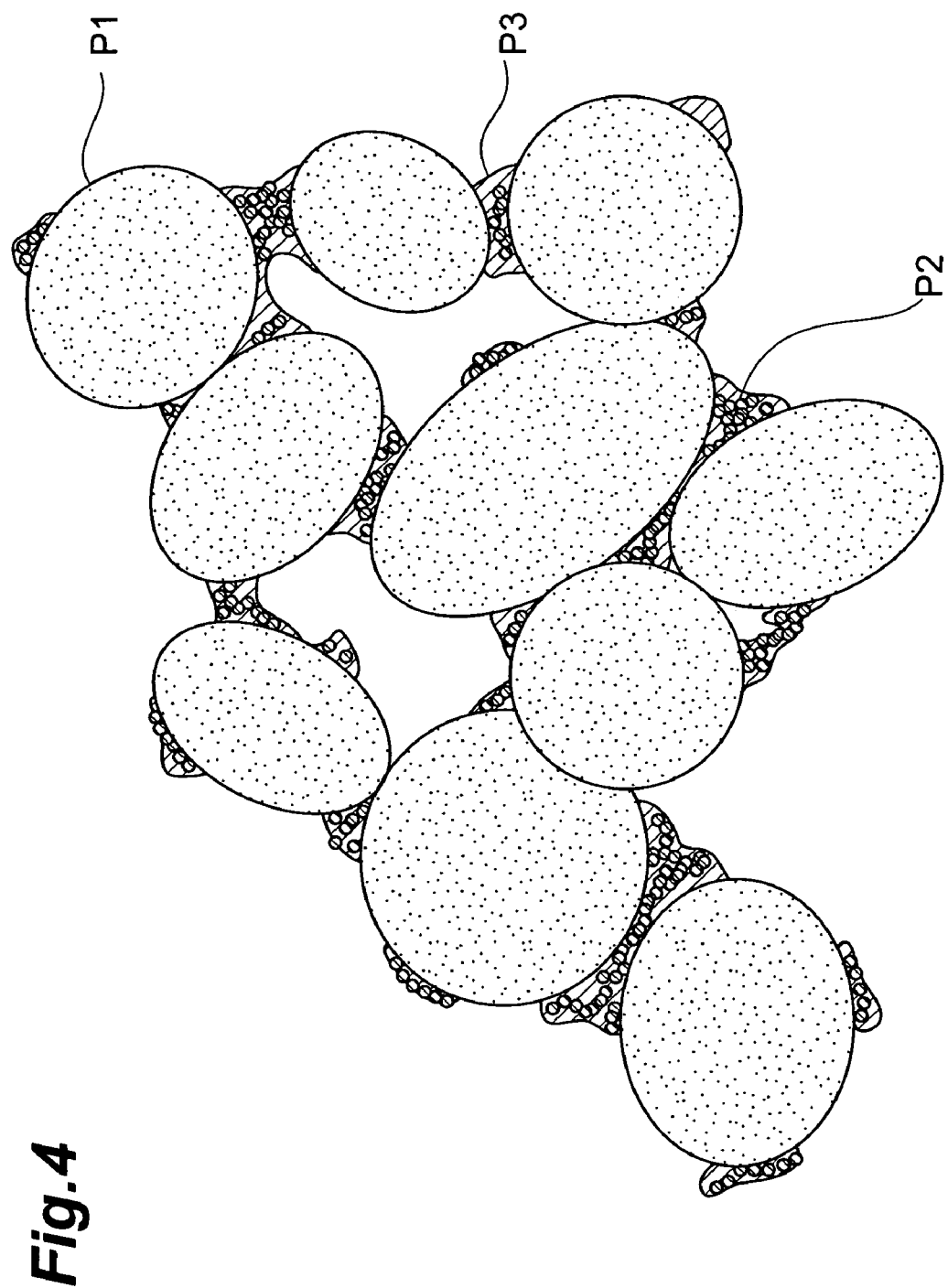
FIG. 4 is a schematic sectional view roughly showing the inner structure of the electrode (composite particle) of the present invention.

In each of the composite particles P10 formed by the method explained in the foregoing, the inner structure schematically shown in FIG. 4 is formed. Namely, though particles P3 made of the binder are used, a structure in which the particles P1 made of the electrode active material and the particles P2 made of the conductive auxiliary agent are electrically coupled to each other without being isolated is formed in the composite particle P2.

Subsequently, the anode lead 22 is electrically connected to the composite particle P10 for the anode 2. Also, the cathode lead 32 is electrically connected to the composite particle P10 for the cathode 3.

Next, an electrolyte layer 4 is formed at the center part of the communicating hole of the case 8. When the electrolyte layer 4 is an electrolytic solution, droplets of the electrolytic solution are arranged. When a porous separator is used for the electrolyte layer 4, an electrolytic solution, a gelled electrolytic solution, or a solid polymer electrolyte is infiltrated therein, and then the separator is disposed at the center part of the communicating hole in the case 8. When the electrolyte layer 4 is a solid electrolyte or a gelled electrolytic solution, it is disposed at the center part of the communicating hole in the case 8.

Subsequently, the anode 2 and the cathode 3 are inserted in the case 8, and are arranged such that the respective leading ends of their composite particles P10 come into contact with the electrolyte layer 4.

When the electrolyte layer 4 is a solid polymer electrolyte, a film made of the solid polymer electrolyte is formed on at least one of, preferably both of, the surfaces of the respective composite particles P10 for the anode 2 and cathode 3, and the anode 2 and cathode 3 are inserted into the case 8 and arranged such that the respective leading end parts of the anode 2 and cathode 3 come into contact with each other.

When the electrolyte layer 4 is a solid polymer electrolyte, droplets of the material liquid containing monomers of the solid polymer electrolyte may be arranged at the center part of the communicating hole in the case 8, and heated or irradiated with light, for example, so as to advance a polymerization reaction of the monomers, thereby forming the electrolyte layer 4 made of the solid polymer electrolyte at the center part of the communicating hole in the case 8.

Subsequently, inner parts of the case 8 near the openings at both ends are filled with a sealant 9, and the case 8 is sealed, whereby an electrochemical device (lithium ion secondary battery) 1 is completed.

Though a preferred embodiment of the present invention is explained in the foregoing, the present invention is not limited thereto.

For example, the electrode formed by the composite particle of the present invention is not limited in particular in terms of structure as long as it is formed by using the composite particle.

Though the foregoing explanation of the embodiment relates to one having the configuration of a secondary battery as the electrochemical device, the electrochemical device comprising the electrode formed by the composite particle of the present invention may be a primary battery, for example. As the electrode active material of the composite particle, not only the materials exemplified in the foregoing, but also those used in conventional primary batteries may be used. Here, the conductive auxiliary agents and binders may be the same as those exemplified in the foregoing.

The electrode formed by the composite particle of the present invention is not limited to electrodes for batteries. For example, the electrode may be used in electrolytic cells, capacitors (electric double layer capacitors, pseudocapacity capacitors, aluminum electrolytic capacitors, etc.), or electrochemical sensors. For example, in the case of the electric double layer capacitor electrode, carbon materials having a high electric double layer capacity such as coconut shell active carbon, pitch type active carbon, and phenol resin type active carbon can be used as an electrode active material constituting the composite particle P10.

Further, for example, using a pyrolysate of ruthenium oxide (or a composite oxide formed between ruthenium oxide and another metal oxide) as an electrode active material in the present invention constituting the composite particle P10, an active material containing layer containing thus obtained composite particle P10 may be formed on a titanium support, so as to construct an electrode.

In the following, the present invention will be explained in further detail with reference to Examples and Comparative Examples, which do not restrict the present invention at all.

EXAMPLE 1

(1) Making of Composite Particle

In the following procedure, a composite particle to become a cathode of a lithium ion secondary battery was made by a method including the above-mentioned granulating step. Here, the composite particle P10 was constituted by a cathode electrode active material (90 mass %), a conductive auxiliary agent (6 mass %), and a binder (4 mass %).

As the cathode electrode active material, particles (each having a BET specific surface area of 0.55 $m^2/g$ and an average particle size of 12 μm) of a mixed metal oxide satisfying a condition in which x=1, y=0.33, z=0.33, and w=2 in mixed metal oxides represented by the general formula of $Li_xMn_yNi_zCo_{1-x-y}O_w$ was used. As the conductive auxiliary agent, acetylene black was used. As the binder, polyvinylidene fluoride was used.

First, in the material liquid preparing step, acetylene black was dispersed into a solution in which polyvinylidene fluoride was dissolved in N,N-dimethylformamide (DMF), i.e., solvent, so as to yield a "material liquid" (containing 3 mass % of acetylene black and 2 mass % of polyvinylidene fluoride).

Subsequently, in the fluidizing step, a gas flow constituted by air was generated in a container having the same configuration as with the fluidizing tank 5 shown in FIG. 3, and a powder of the mixed metal oxide was introduced therein, so as to form a fluidized layer. Next, in the spray-drying step, the above-mentioned material liquid was sprayed onto the fluidized powder of the mixed metal oxide, so as to be attached to the powder surface. Here, the temperature in the atmosphere in which the powder was placed at the time of spraying was held constant, whereby N,N-dimethylformamide was eliminated from the powder surface substantially simultaneously with the spraying. Thus, acetylene black and polyvinylidene fluoride were brought into close contact with the powder surface, so as to yield a composite particle P10 (having an average particle size of 150 μm).

The respective amounts of the electrode active material, conductive auxiliary agent, and binder used in the granulating process were adjusted such that these components in the finally obtained composite particle P10 attained the above-mentioned mass ratio values.

Subsequently, in the following procedure, a composite particle usable for forming an active material containing layer of an anode of the lithium ion secondary battery was made by a method including the above-mentioned granulating step. Here, the composite particle P10 was constituted by an anode electrode active material (90 mass %), a conductive auxiliary agent (6 mass %), and a binder (4 mass %).

As the anode electrode active material, short fibrous synthetic graphite (having a BET specific surface area of 1.0 $m^2/g$ and an average particle size of 19 μm) was used. As the conductive auxiliary agent, acetylene black was used. As the binder, polyvinylidene fluoride was used.

First, in the material liquid preparing step, acetylene black was dispersed into a solution in which polyvinylidene fluoride was dissolved in N,N-dimethylformamide (DMF), i.e., solvent, so as to yield a "material liquid" (containing 3 mass % of acetylene black and 2 mass % of polyvinylidene fluoride).

Subsequently, in the spray-drying step, the above-mentioned material liquid was sprayed onto the fluidized powder of the mixed metal oxide in a container having the same configuration as with the fluidizing tank 5 shown in FIG. 3, so as to be attached to the powder surface. Here, the temperature in the atmosphere in which the powder was placed at the time of spraying was held constant, whereby N,N-dimethylformamide was eliminated from the powder surface substantially simultaneously with the spraying. Thus, acetylene black and polyvinylidene fluoride were brought into close contact with the powder surface, so as to yield a composite particle P10 (having an average particle size of 150 μm).

The respective amounts of the electrode active material, conductive auxiliary agent, and binder used in the granulating process were adjusted such that these components in the finally obtained composite particle P10 attained the above-mentioned mass ratio values.

(2) Preparation of Material Liquid for Solid Electrolyte

Under the following condition, a conductive polymer having a lithium ion conductivity to become an electrolyte layer was synthesized. Namely, $LiN(C_2F_5SO_2)_2$ (product name "LIBETI" manufactured by 3M) and terminal acryloyl-denatured alkylene oxide macromonomer (product name "Elexcel" manufactured by Dai-Ichi Kogyo Seiyaku Co., Ltd., hereinafter referred to as "macromonomer") were mixed in acetonitrile, so as to prepare a mixed liquid containing $LiN(C_2F_5SO_2)_2$ and the macromonomer. Here, the mixing ratio of $LiN(C_2F_5SO_2)_2$ and the macromonomer was adjusted so as to become 1:10 in terms of the mole ratio of Li atoms constituting $LiN(C_2F_5SO_2)_2$ and O (oxygen) atoms in the macromonomer.

Next, a photopolymerization initiator (benzophenone type photopolymerization initiator) was further mixed into the mixed liquid. The amount of photopolymerization initiator introduced in this step was adjusted such that the mass of photopolymerization initiator/the mass of "Elexcel"=1:100.

Subsequently, using an evaporator, acetonitrile was eliminated from the mixed liquid obtained after the above-mentioned step, so as to yield a liquid with an increased viscosity (hereinafter referred to as "Li-salt macromonomer solution).

(3) Making of Battery

First, using a sealant, a platinum wire (having a diameter of 20 μm) to become a cathode lead was secured to one end part of a glass tube (having an inner diameter of 20 μm, an outer diameter of 300 μm, and a width in the center axis direction of 600 μm). Here, the platinum wire was disposed such that its leading end was placed at a position separated by 100 μm from the end part of the glass tube.

Subsequently, the glass tube was put into a glove box filled with a dry argon gas. A microscope was placed in the glove box, so that operations could be observed with the microscope. Then, using a manipulator, one composite particle (having a diameter of 150 μm) for the cathode was pushed with a pointed leading end part of a needle (having a diameter of 100), so as to drop into the glass tube arranged vertically, whereby the composite particle and the above-mentioned platinum wire to become the cathode lead were brought into electric contact with each other (connected together).

Then, using a manipulator and a micropipette for injecting minute droplets, the Li-salt macromonomer solution was fed dropwise into the vertical glass tube, so as to form a liquid film having a thickness of 30 μm from the upper end part of the cathode composite particle.

Next, the glass tube was irradiated with UV rays, so as to advance the polymerization reaction of the macromonomer contained in the liquid film, thereby generating a conductive polymer (polyalkylene oxide type solid polymer electrolyte). Here, the curing of the liquid film proceeds as the conductive polymer is generated upon the irradiation with UV rays.

Subsequently, using the manipulator, one composite particle (having a diameter of 150 μm) for the anode was pushed with a pointed leading end part of a needle (having a diameter of 100), so as to drop into the glass tube arranged vertically, whereby the composite particle was placed on the electrolyte layer.

Then, a platinum wire (having a diameter of 20 μm) to become an anode lead was brought into electric contact with (connected to) the anode composite particle, and was sealed with an epoxy resin. Thus, an all-solid battery was completed.

Battery Characteristic Evaluation Test

For the battery of Example 1, constant-current charging/discharging characteristics were measured. As a result, a capacity of 0.7 μAh was obtained when the current was 200 nA. When the operation voltage was 3 V, a characteristic of 2.1 μWh was obtained.

EXAMPLE 2

(1) Making of Composite Particle

In the following procedure, composite particles to become an anode (first electrode) and a cathode (second electrode) of an electric double layer capacitor were made by a method including the above-mentioned granulating step. Here, the composite particle P10 was constituted by an electrode active material (88 mass %), a conductive auxiliary agent (4 mass %), and a binder (8 mass %).

As the electrode active material, short fibrous steam-activated carbon (having a BET specific surface area of 2000 $m^2/g$ and an average particle size of 17 μm) was used. As the conductive auxiliary agent, acetylene black was used. As the binder, polyvinylidene fluoride was used.

First, in the material liquid preparing step, acetylene black was dispersed into a solution in which polyvinylidene fluoride was dissolved in N,N-dimethylformamide [(DMF), i.e., solvent], so as to yield a "material liquid" (containing 1.5 mass % of acetylene black and 3 mass % of polyvinylidene fluoride).

Subsequently, in the spray-drying step, the above-mentioned material liquid was sprayed onto the fluidized powder of synthetic graphite in a container having the same configuration as with the fluidizing tank 5 shown in FIG. 3, so as to be attached to the powder surface. Here, the temperature in the atmosphere in which the powder was placed at the time of spraying was held constant, whereby N,N-dimethylformamide was eliminated from the powder surface substantially simultaneously with the spraying. Thus, acetylene black and polyvinylidene fluoride were brought into close contact with the powder surface, so as to yield a composite particle P10 (having an average particle size of 150 μm).

The respective amounts of the electrode active material, conductive auxiliary agent, and binder used in the granulating process were adjusted such that these components in the finally obtained composite particle P10 attained the above-mentioned mass ratio values.

(2) Preparation of Electrolytic Solution

A 1 mol/L tetraethylammonium tetrafluoroborate/propylene carbonate solution to become an electrolyte solution was prepared.

(3) Making of Electric Double Layer Capacitor

First, using a sealant, a platinum wire (having a diameter of 20 μm) to become a cathode lead was secured to one end part of a glass tube (having an inner diameter of 20 μm, an outer diameter of 300 μm, and a width in the center axis direction of 600 μm). Here, the platinum wire was disposed such that its leading end was placed at a position separated by 100 μm from the end part of the glass tube.

Subsequently, the glass tube was put into a glove box filled with a dry argon gas. A microscope was placed in the glove box, so that operations could be observed with the microscope. Then, using a manipulator, one composite particle (having a diameter of 150 μm) for the cathode was pushed with a pointed leading end part of a needle (having a diameter of 100), so as to drop into the glass tube arranged vertically, whereby the composite particle and the above-mentioned platinum wire to become the cathode lead were brought into electric contact with each other (connected together).

Next, using the manipulator, a glass fiber mass (having a diameter of 50 μm) was pushed down into the vertical glass tube. Then, using a micropipette for injecting minute droplets, the 1 mol/L tetraethylammonium tetrafluoroborate/propylene carbonate solution was fed dropwise into the vertical glass tube, so as to wet the glass fiber mass.

Subsequently, using the manipulator, one composite particle (having a diameter of 150 μm) for the anode was pushed with a pointed leading end part of a needle (having a diameter of 100), so as to drop into the glass tube arranged vertically, whereby the composite particle was placed on the electrolyte layer.

Then, a platinum wire (having a diameter of 20 μm) to become an anode lead was brought into electric contact with (connected to) the anode composite particle, and was sealed with an epoxy resin. Thus, an electric double layer capacitor was completed.

Capacitor Characteristic Evaluation Test

For the electric double layer capacitor of Example 2, constant-current charging/discharging characteristics at an operation temperature of 25° C. were measured. As a result, a capacity of 100 μF or 0.1 μAh was obtained at 0 V to 2.5 V when the current was 20 μA. When the operation voltage was 3 V, a characteristic of 0.25 μWh was obtained.

Observation of Cross Section of Active Material Containing Layer

In the following procedure, an electrode for an electric double layer capacitor was made, SEM and TEM photographs of a cross section of its active material containing layer were taken, and the inner structure of the active material containing layer was observed. The active material containing layer was formed from composite particles, whereby the inner structure of the active material containing layer represented the inner structure of an electrode in the electrochemical device in accordance with the present invention made of one composite particle.

EXAMPLE 3

(1) Making of Electrode

In the following procedure, the electrode for the electric double layer capacitor was made. First, a method of forming an anode will be explained. As the electrode active material, short fibrous steam-activated carbon (having a BET specific surface area of 2000 $m^2/g$ and an average particle size of 17 µm) was used. As the conductive auxiliary agent, acetylene black was used. As the binder, polyvinylidene fluoride was used. In the above-mentioned granulating step, a composite particle was made such that the mass ratio of electrode active material/conductive auxiliary agent/binder=88:4:8. Using this composite particle alone, an electric double layer capacitor electrode including an active material containing layer having a thickness of 100 µm was obtained by a hot roll press.

COMPARATIVE EXAMPLE 1

After polyvinylidene fluoride was dissolved in N-methylpyrrolidone with the same constituent materials and constituent ratio as with the electric double layer capacitor electrode of Example 3, active carbon and acetylene black were added thereto and dispersed therein, so as to yield an electrode forming slurry (coating liquid). Thus obtained slurry was applied onto an aluminum foil by doctor blading and dried, and then was pressed by calendering, whereby an electric double layer capacitor electrode including an active material containing layer having a thickness of 100 µm was obtained.

Observation of Cross Section of Active Material Containing Layer

The electrodes of Example 3 and Comparative Example 1 were partly punched out into rectangular pieces (each having a size of 5 mm×5 mm). Subsequently, the active material containing layer of each piece of the electrodes in accordance with Example 3 and Comparative Example 1 was buried in a resin (epoxy resin), and thus obtained surface of the active material containing layer was ground. Next, using a microtome, measurement samples (each having a size of 0.1 mm×0.1 mm) for SEM and TEM photograph observations were obtained from each of the pieces of the electrodes in accordance with Example 3 and Comparative Example 1. For each measurement sample, SEM and TEM photographs were taken.

FIGS. 5 to 10 show SEM and TEM photographs of the active material containing layer of the electrode in accordance with Example 3. FIGS. 11 to 16 show SEM and TEM photographs of the active material containing layer of the electrode in accordance with Comparative Example 1.

Figure 5:
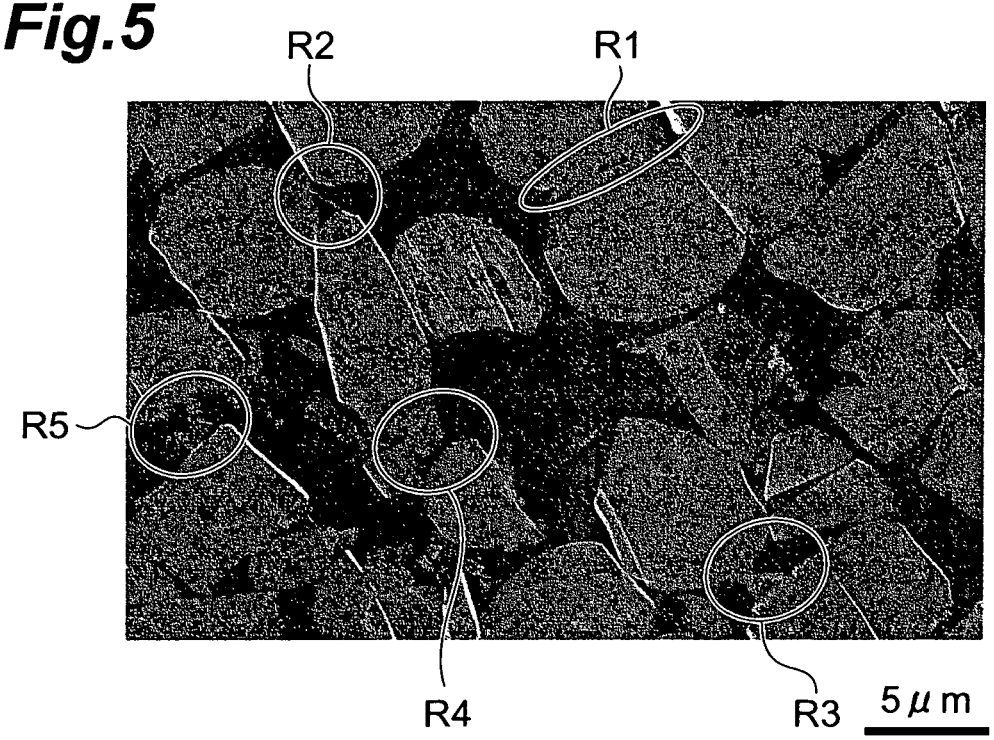
FIG. 5 is a view showing an SEM photograph taking a cross section of an active material containing layer (a layer formed by the composite particle) of the electrode made by the manufacturing method (dry method) of the present invention.
Figure 6:
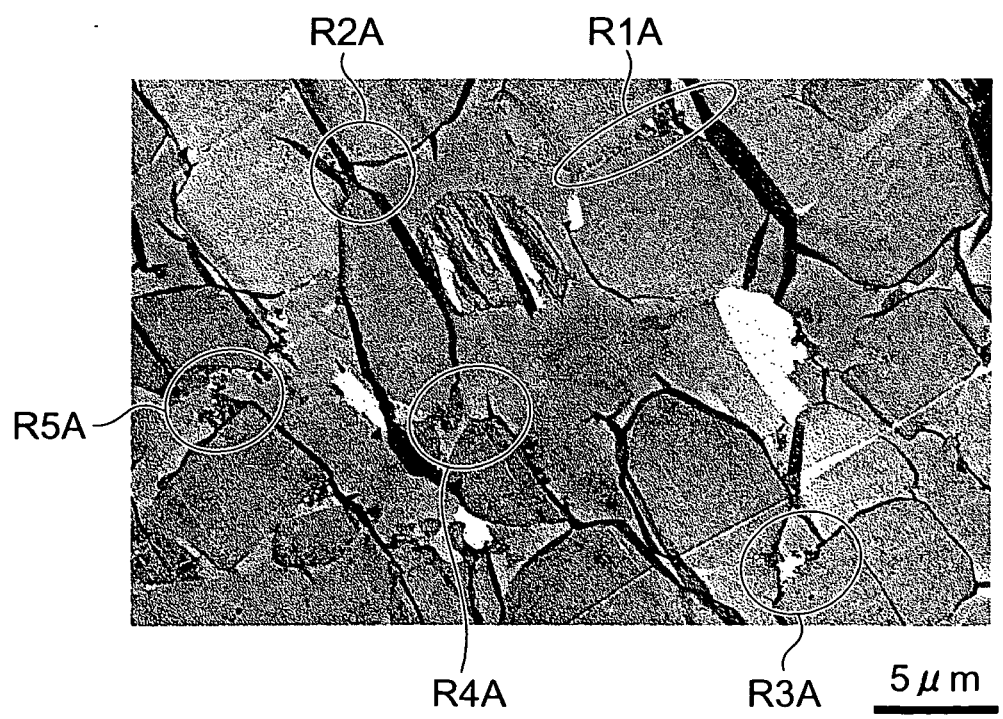
FIG. 6 is a view showing a TEM photograph taking the cross section (the part identical to that shown in FIG. 5) of the active material containing layer (the layer formed by the composite particle) of the electrode made by the manufacturing method (dry method) of the present invention.

FIG. 5 is a view showing an SEM photograph taking a cross section of the active material containing layer (layer formed from a composite particle) in the electrode made by the manufacturing method (dry method) in accordance with the present invention. FIG. 6 is a view showing a TEM photograph taking the cross section (in the same part as that shown in FIG. 5) of the active material containing layer (layer formed from the composite particle) in the electrode made by the manufacturing method (dry method) in accordance with the present invention.

Figure 7:
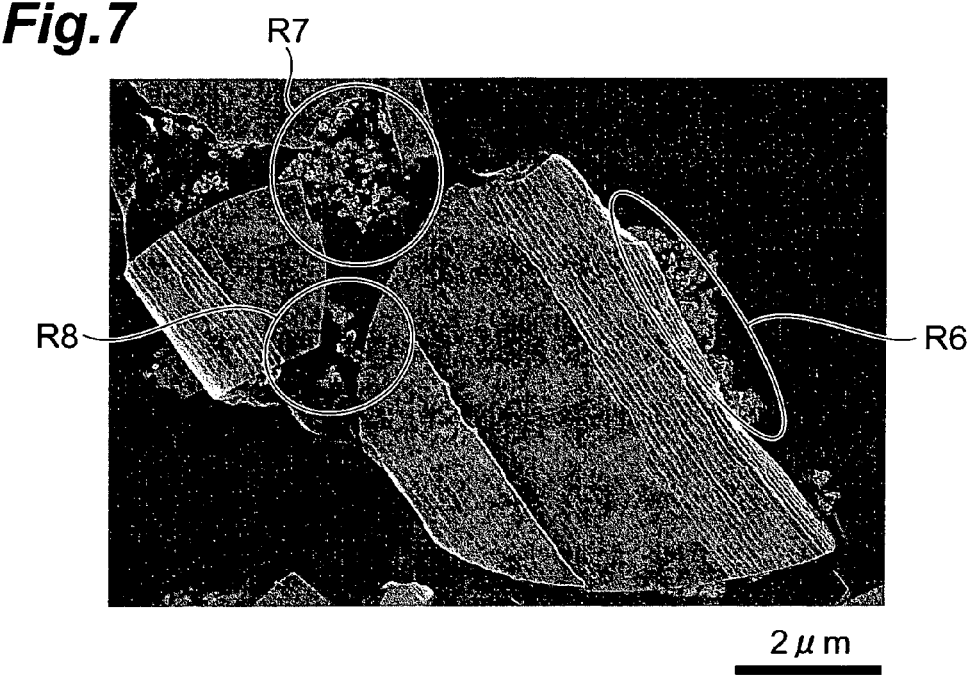
FIG. 7 is a view showing an SEM photograph taking a cross section of the active material containing layer (the layer formed by the composite particle) of the electrode made by the manufacturing method (dry method) of the present invention.
Figure 8:
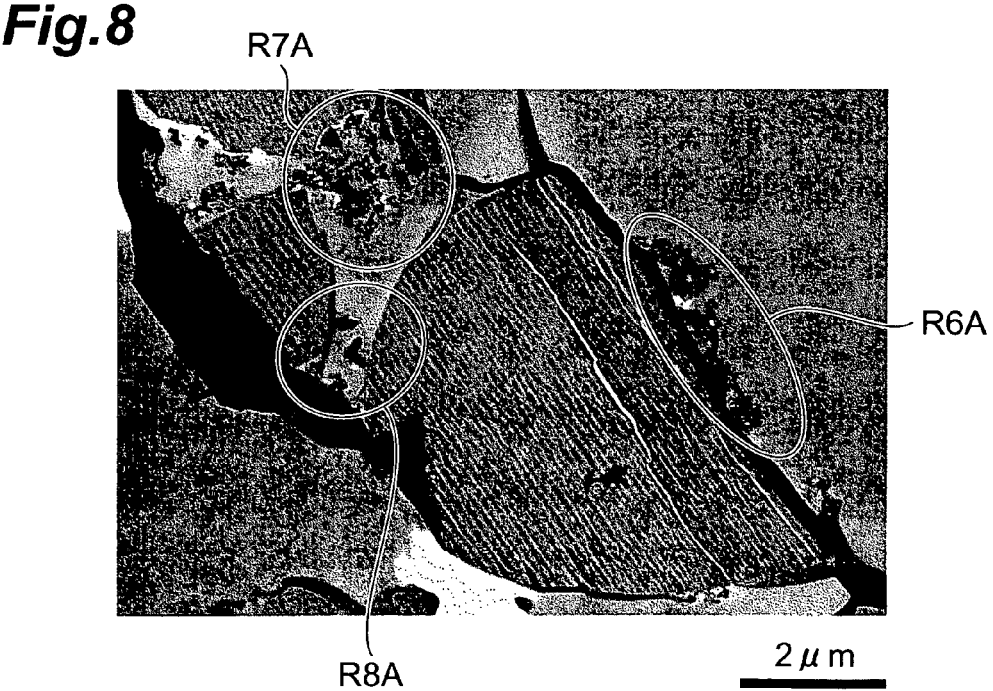
FIG. 8 is a view showing a TEM photograph taking the cross section (the part identical to that shown in FIG. 7) of the active material containing layer (the layer formed by the composite particle) of the electrode made by the manufacturing method (dry method) of the present invention.

FIG. 7 is a view showing an SEM photograph taking a cross section of the active material containing layer (layer formed from the composite particle) in the electrode made by the manufacturing method (dry method) in accordance with the present invention. FIG. 8 is a view showing a TEM photograph taking the cross section (in the same part as that shown in FIG. 7) of the active material containing layer (layer formed from the composite particle) in the electrode made by the manufacturing method (dry method) in accordance with the present invention.

Figure 9:
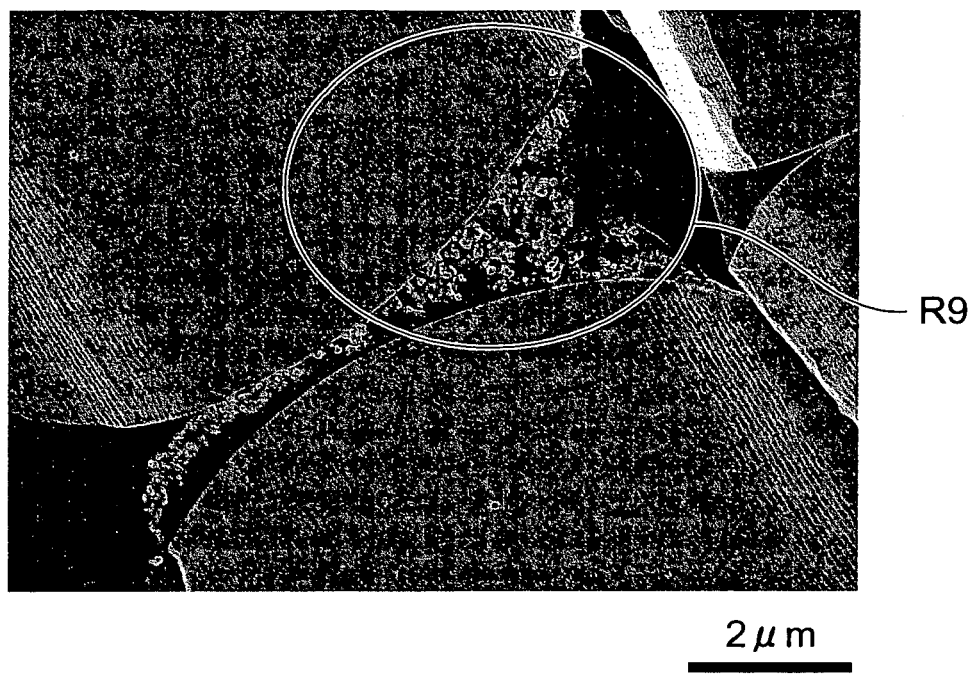
FIG. 9 is a view showing an SEM photograph taking a cross section of the active material containing layer (the layer formed by the composite particle) of the electrode made by the manufacturing method (dry method) of the present invention.
Figure 10:
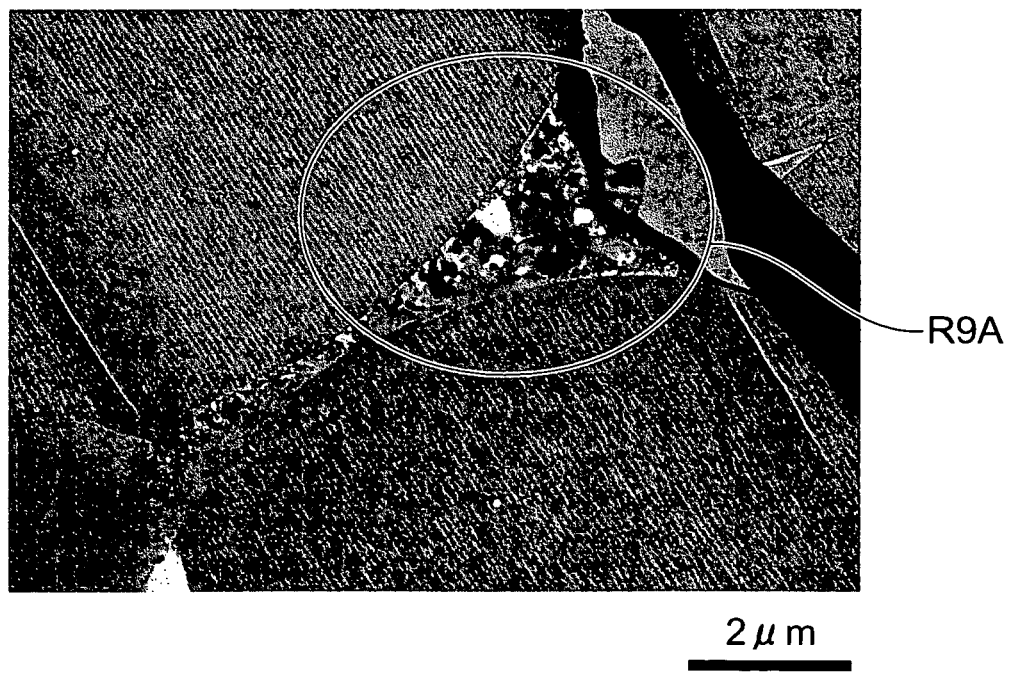
FIG. 10 is a view showing a TEM photograph taking the cross section (the part identical to that shown in FIG. 9) of the active material containing layer (the layer formed by the composite particle) of the electrode made by the manufacturing method (dry method) of the present invention.

FIG. 9 is a view showing an SEM photograph taking a cross section of the active material containing layer (layer formed from the composite particle) in the electrode made by the manufacturing method (dry method) in accordance with the present invention. FIG. 10 is a view showing a TEM photograph taking the cross section (in the same part as that shown in FIG. 9) of the active material containing layer (layer formed from the composite particle) in the electrode made by the manufacturing method (dry method) in accordance with the present invention.

Figure 11:
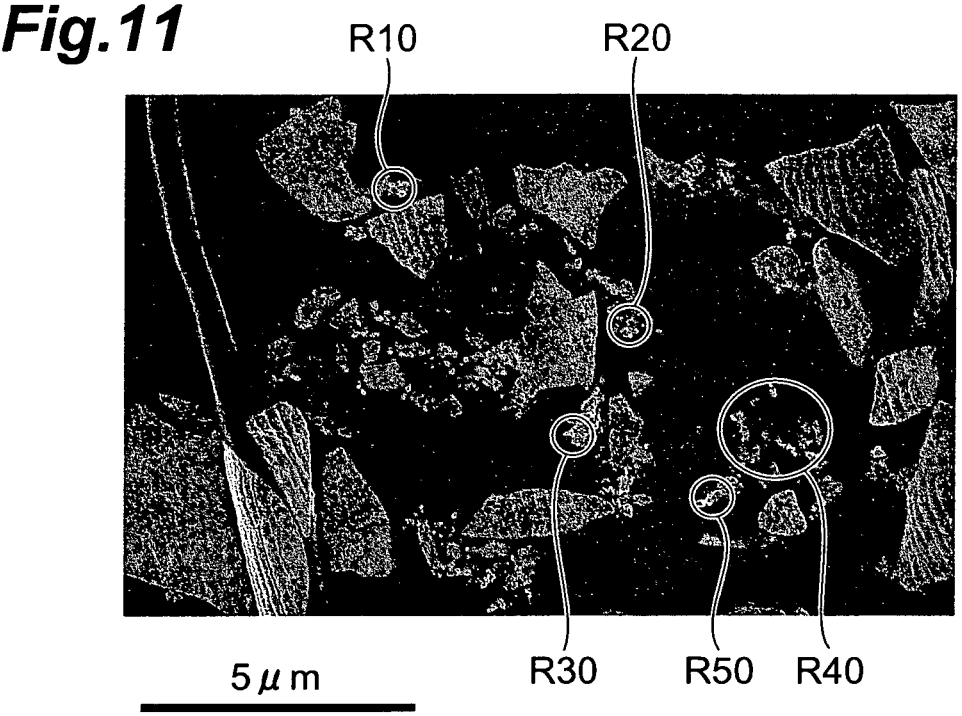
FIG. 11 is a view showing an SEM photograph taking a cross section of an active material containing layer (the layer formed by the composite particle) of an electrode made by a conventional manufacturing method (wet method)
Figure 12:
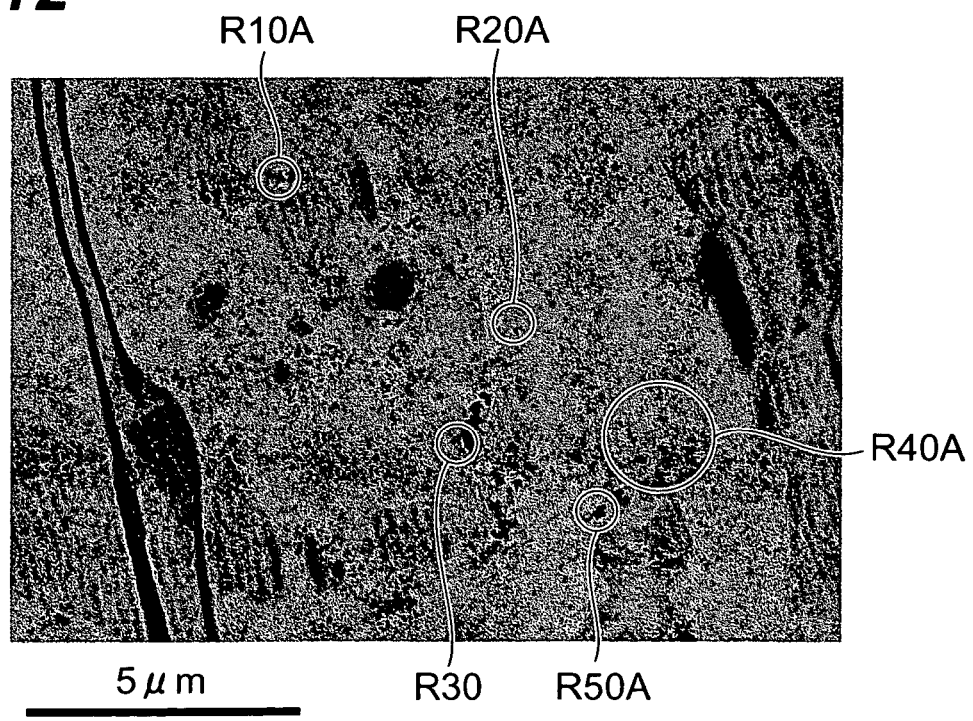
FIG. 12 is a view showing a TEM photograph taking the cross section (the part identical to that shown in FIG. 11) of the active material containing layer (the layer formed by the composite particle) of the electrode made by the conventional manufacturing method (wet method)

FIG. 11 is a view showing an SEM photograph taking a cross section of the active material containing layer (layer formed from a composite particle) in the electrode made by a conventional manufacturing method (wet method). FIG. 12 is a view showing a TEM photograph taking the cross section (in the same part as that shown in FIG. 11) of the active material containing layer (layer formed from the composite particle) in the electrode made by the conventional manufacturing method (wet method).

Figure 13:
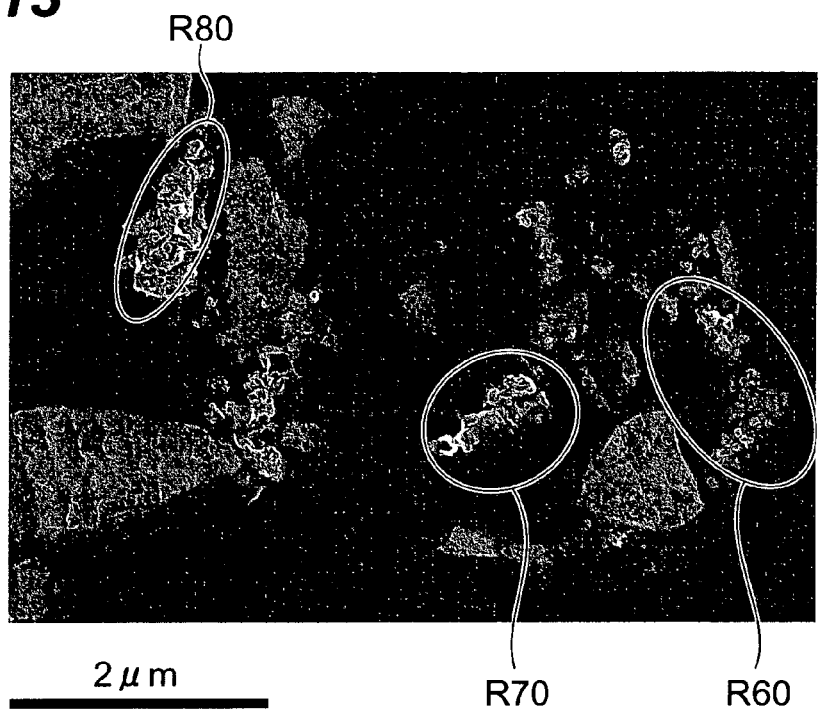
FIG. 13 is a view showing an SEM photograph taking a cross section of the active material containing layer (the layer formed by the composite particle) of the electrode made by the conventional manufacturing method (wet method)
Figure 14:
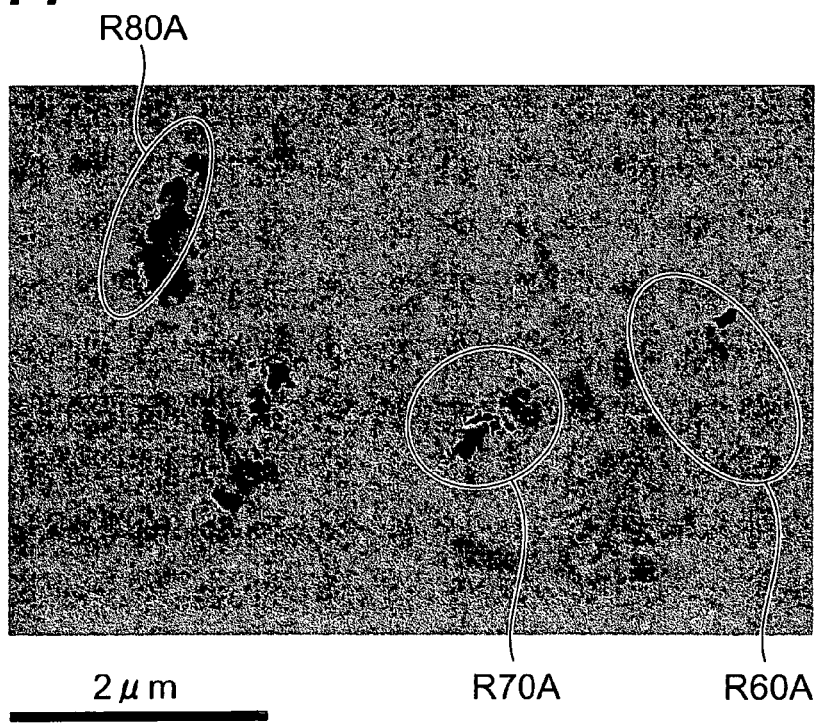
FIG. 14 is a view showing a TEM photograph taking the cross section (the part identical to that shown in FIG. 13) of the active material containing layer (the layer formed by the composite particle) of the electrode made by the conventional manufacturing method (wet method)

FIG. 13 is a view showing an SEM photograph taking a cross section of the active material containing layer (layer formed from the composite particle) in the electrode made by a conventional manufacturing method (wet method). FIG. 14 is a view showing a TEM photograph taking the cross section (in the same part as that shown in FIG. 13) of the active material containing layer (layer formed from the composite particle) in the electrode made by the conventional manufacturing method (wet method).

Figure 15:
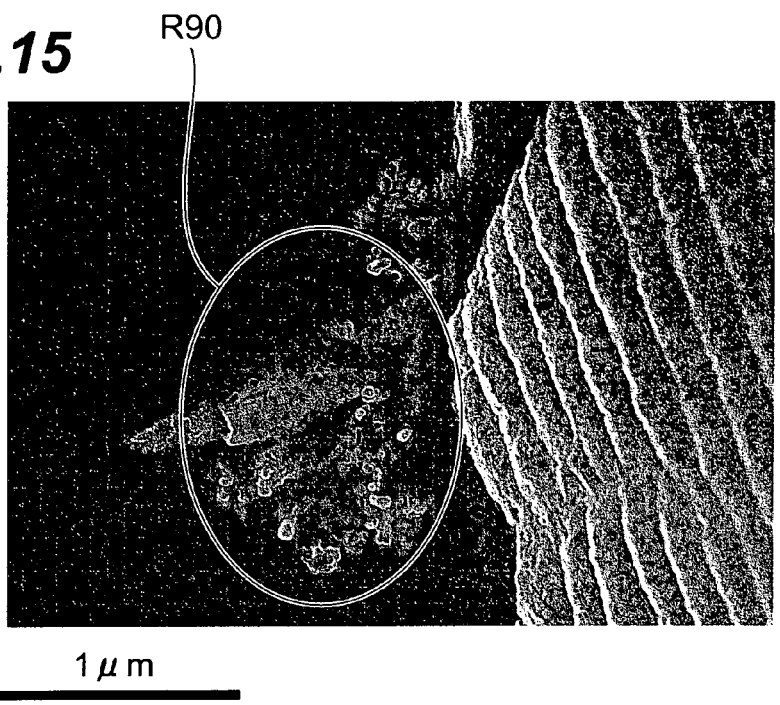
FIG. 15 is a view showing an SEM photograph taking a cross section of the active material containing layer (the layer formed by the composite particle) of the electrode made by the conventional manufacturing method (wet method)
Figure 16:
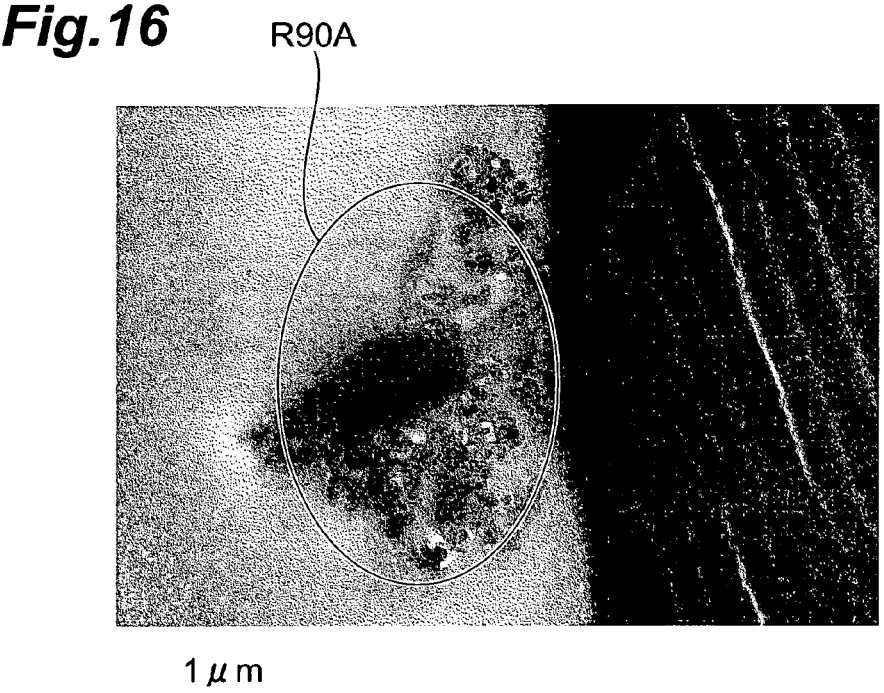
FIG. 16 is a view showing a TEM photograph taking the cross section (the part identical to that shown in FIG. 15) of the active material containing layer (the layer formed by the composite particle) of the electrode made by the conventional manufacturing method (wet method)

FIG. 15 is a view showing an SEM photograph taking a cross section of the active material containing layer (layer formed from the composite particle) in the electrode made by a conventional manufacturing method (wet method). FIG. 16 is a view showing a TEM photograph taking the cross section (in the same part as that shown in FIG. 15) of the active material containing layer (layer formed from the composite particle) in the electrode made by the conventional manufacturing method (wet method).

As can be seen from the results shown in

FIGS. 5 and 6, it was verified that the electrode of Example 3 had the following structure. For example, the results of observation of photographed regions R1 to R5 in FIG. 5 and photographed regions R1A to R5A in FIG. 6 (parts identical to R1 to R5 in FIG. 5, respectively) showed that active carbon particles located close to each other were combined electrically and physically by an aggregate constituted by the conductive auxiliary agent and binder, so as to form favorable electron conduction networks and ion conduction networks. Namely, it was seen that favorable electron conduction networks and ion conduction networks were formed in the inner structure of the electrode constituted by one composite particle in the electrochemical device in accordance with the present invention.

The above-mentioned inner structure of the active material containing layer was more clearly seen from the results of observation of photographed regions R6 to R8 in FIG. 7 and photographed regions R6A to R8A in FIG. 8 (parts identical to R6 to R8 in FIG. 7, respectively), and the photographed region R9 in FIG. 9 and the photographed region R9A in FIG. 10 (part identical to R9 in FIG. 9), the respective sets of photographs being taken with different magnifications.

On the other hand, as seen from the results shown in FIGS. 11 and 12, it was verified that the electrode of Comparative Example 1 had the following structure. For example, from the results of observation of photographed regions R10 to R50 in FIG. 11 and photographed regions R10A to R50A in FIG. 12 (parts identical to R10 to R50 in FIG. 11, respectively), it was remarkably seen that the aggregates made of the conductive auxiliary agent and binder were electrically and physically isolated from the active carbon particles, whereby electron conduction networks and ion conduction networks were not formed as sufficiently as in the active material containing layer of Example 3.

The above-mentioned inner structure of the active material containing layer was more clearly seen from the results of observation of photographed regions R60 to R80 in FIG. 13 and photographed regions R60A to R80A in FIG. 14 (parts identical to R60 to R80 in FIG. 13, respectively), and the photographed region R90 in FIG. 15 and the photographed region R90A in FIG. 16 (part identical to R90 in FIG. 15), the respective sets of photographs being taken with different magnifications.

What is claimed is:

1. An electrochemical device comprising, at least, a first electrode, a second electrode, and an electrolyte layer having an ionic conductivity, the first and second electrodes opposing each other by way of the electrolyte layer;

wherein at least one of the first and second electrodes comprises only a single composite particle containing an electrode active material, a conductive auxiliary agent having an electronic conductivity, and a binder adapted to bind the electrode active material and conductive auxiliary agent to each other; and wherein the electrode active material and conductive auxiliary agent are electrically coupled to each other without being isolated in the composite particle; and the composite particle is substantially spherical and has a particle size of 0.2 to 2000 µm.

2. An electrochemical device according to claim 1, wherein the composite particle is formed by way of a granulating step of integrating the conductive auxiliary agent and binder with a particle made of the electrode active material in close contact with each other; and wherein the granulating step comprises:

a material liquid preparing step of preparing a material liquid containing the binder, the conductive auxiliary agent, and a solvent;

a fluidizing step of putting the particle made of the electrode active material into a fluidizing tank so as to fluidize the particle made of the electrode active material; and a spray-drying step of spraying the material liquid into a fluidized layer containing the particle made of the electrode active material so as to attach the material liquid to the particle made of the electrode active material, and drying the material liquid so as to eliminate the solvent from the material liquid attached to a surface of the particle made of the electrode active material, thereby causing the binder to bring the particle made of the electrode active material and a particle made of the conductive auxiliary agent into close contact with each other.

3. An electrochemical device according to claim 1, wherein the binder comprises a conductive polymer.

4. An electrochemical device according to claim 1, wherein the composite particle further comprises a conductive polymer.

5. An electrochemical device according to claim 3, wherein the conductive polymer has an ionic conductivity.

6. An electrochemical device according to claim 3, wherein the conductive polymer has an electronic conductivity.

7. An electrochemical device according to claim 2, wherein the fluidizing step generates a gas flow in the fluidizing tank, puts the particle made of the electrode active material into the gas flow, and fluidizes the particle made of the electrode active material.

8. An electrochemical device according to claim 2, wherein the granulating step adjusts the temperature in the fluidizing tank to a temperature of at least 50° C. but not higher than the melting point of the binder.

9. An electrochemical device according to claim 2, wherein the gas flow generated in the fluidizing tank in the granulating step is a gas flow comprising an air, a nitrogen gas, or an inert gas.

10. An electrochemical device according to claim 1, further comprising a case for accommodating the first electrode, second electrode, and electrolyte layer in a closed state, the case having a substantially columnar form.

11. An electrochemical device according to claim 1, further comprising a case for accommodating the first electrode, second electrode, and electrolyte layer in a closed state, wherein the case fits in a space having a volume of $1.5 \times 10^{-10}$ to $9.0 \times 10^{-3}$ cm$^3$.

12. An electrochemical device according to claim 1, wherein the electrolyte layer comprises a solid electrolyte; and wherein at least one of the first and second electrodes is a particle made of metal lithium or a lithium alloy.

13. The electrochemical device according to claim 1, wherein both of the first and second electrodes comprise only a single composite particle.

14. The electrochemical device according to claim 13, further comprising a case in which the first electrode, the second electrode and the electrolyte layer are accommodated, the case having a tubular shape and the first electrode being disposed to one side in the case in an axial direction of the case, and the second electrode being disposed to the other side in the case in the axial direction.

* * * * *